(12) United States Patent
Zhu et al.

(10) Patent No.: US 8,987,354 B2
(45) Date of Patent: Mar. 24, 2015

(54) BIOCOMPATIBLE POLYMER NANOPARTICLE COATING COMPOSITION AND METHOD OF PRODUCTION THEREOF

(76) Inventors: Jingxu Zhu, London (CA); Hiran Perinpanayagam, London (CA); Mohammad S. Mozumder, London (CA); Hui Zhang, London (CA); Wen Shi, London (CA)

(*) Notice: Subject to any disclaimer, the term of this patent is extended or adjusted under 35 U.S.C. 154(b) by 39 days.

(21) Appl. No.: 13/455,873

(22) Filed: Apr. 25, 2012

(65) Prior Publication Data
US 2013/0059946 A1 Mar. 7, 2013

Related U.S. Application Data

(60) Provisional application No. 61/478,883, filed on Apr. 25, 2011.

(51) Int. Cl.
| | |
|---|---|
| C08K 3/22 | (2006.01) |
| C08K 3/36 | (2006.01) |
| C08L 33/02 | (2006.01) |
| C08L 63/00 | (2006.01) |
| C08L 63/02 | (2006.01) |
| C08L 67/00 | (2006.01) |
| C08L 67/02 | (2006.01) |
| C08L 75/04 | (2006.01) |
| C09D 7/12 | (2006.01) |
| C09D 163/00 | (2006.01) |
| C09D 167/00 | (2006.01) |
| A61C 8/00 | (2006.01) |
| A61C 13/00 | (2006.01) |
| A61F 2/00 | (2006.01) |
| B05D 1/06 | (2006.01) |
| B05D 3/02 | (2006.01) |

(52) U.S. Cl.
CPC .......... *C09D 7/1283* (2013.01); *C09D 163/00* (2013.01); *C09D 167/00* (2013.01); *C09D 7/1266* (2013.01); *B05D 1/06* (2013.01); *B05D 3/0254* (2013.01)

USPC .......... 523/435; 523/451; 523/457; 523/458; 523/466; 523/467; 524/507; 524/508; 524/513; 524/520; 524/546; 524/556; 524/590; 524/601; 623/18.11

(58) Field of Classification Search
None
See application file for complete search history.

(56) References Cited

U.S. PATENT DOCUMENTS

| | | | |
|---|---|---|---|
| 5,921,933 A * | 7/1999 | Sarkis et al. .................. | 600/459 |
| 6,833,185 B2 | 12/2004 | Zhu et al. | |
| 2003/0059742 A1* | 3/2003 | Webster et al. ............ | 433/201.1 |
| 2007/0110823 A1* | 5/2007 | Kong et al. .................. | 424/602 |
| 2010/0216804 A1* | 8/2010 | Zale et al. ..................... | 514/249 |
| 2010/0331819 A1* | 12/2010 | Hossainy et al. ............. | 604/523 |

OTHER PUBLICATIONS

Derwent accession No. 2005-273580 for Chinese Patent No. 1552773 A, Dec. 8, 2004, Cui et al., one page.*
Patel et al., International Journal of Pharmaceutical and Clinical Research 2009; 1(2): 55-61.
Webster et al., J. of Biomed. Mat. Res. Pt. A 74A (4), 677-686; published online: Jul. 20, 2005.

* cited by examiner

*Primary Examiner* — Robert Sellers
(74) *Attorney, Agent, or Firm* — Hill & Schumacher

(57) ABSTRACT

Biocompatible polymeric coating compositions having nanoscale surface roughness and methods of forming such coatings are described. A polymeric biocompatible coating may be produced using a powder coating method, where one or more thermosetting polymer resins and one or more biocompatible materials are mixed and extruded, ground into microscale particles, and mixed with nanoparticles to form a dry powder mixture that may be coated onto a substrate according to a powder coating method. Alternatively, the thermosetting polymeric resin can be first extruded and ground into microscale particles, and then mixed with the biocompatible materials in particular form of nanoscale to microscale in size, and then further mixed with nanoparticles to form a dry powder mixture for coating. Bioactive materials may also be selectively added into the polymeric coating in a similar way as the biocompatible materials, either before or after the extrusion, to form a bioactive polymeric coating.

16 Claims, 12 Drawing Sheets

BIOCOMPATIBLE POLYMER NANOPARTICLE COATING COMPOSITION AND METHOD OF PRODUCTION THEREOF

CROSS REFERENCE TO RELATED PATENT APPLICATION

This patent application relates to U.S. Provisional Patent Application Ser. No. 61/478,883 filed on Apr. 25, 2011, titled "BIOCOMPATIBLE POLYMER NANOPARTICLE COATING COMPOSITION AND METHOD OF PRODUCTION THEREOF", the entire contents of which are incorporated herein by reference.

BACKGROUND

The present disclosure relates to biocompatible devices and coatings.

Implantable prostheses are increasingly being utilized in orthopedics to treat degenerative diseases and traumatic fractures. These include hip and joint replacements as well as the internal fixation of fractures. Similarly, dental implants are increasingly being utilized in dentistry to treat missing, diseased and damaged dentitions. However, the long-term retention and functionality of these implants is dependent on their biocompatibility and their integration into the surrounding tissues. Indeed, despite some biocompatibility of certain currently available implants, the biological response can be inadequate and tissue integration compromised.

The currently available implants are dominated by titanium and titanium alloys because of their physical and mechanical properties and biocompatibility. This biocompatibility is characterized by a general biological inertness that leads to the formation of a mechanical bond with the surrounding tissues. However, in the unmodified state their lack of bioactivity can restrict their tissue integration.

To improve their biocompatibility and expand their bioactivity, titanium implant surfaces have been subject to a range of surface modifications and enhancements. These modifications include: (1) enhanced surface topography and roughness through mechanical and micro-machining methods, plasma spraying, sandblasting and the application of surface coatings; (2) improved corrosion resistance through surface coatings; and (3) enhanced bioactivity through surface oxidation and coatings.

Among these various implant surface modification techniques, the plasma spraying technology is well developed and most commonly used. In this technique, powder materials melt in an ultra-high temperature plasma flame and the coating rapidly solidifies under high-speed airflow. Although the plasma spraying process is fast, uniform, repeatable and suitable for industrial production, it is an expensive process that is not suitable for coating porous metal surfaces. Moreover, the coatings are not strongly adherent to the implants and have poor long-term durability.

Other approaches to improve the biocompatibility of implant surfaces include surface oxidation and modification by an alkali treatment, and the addition of calcium phosphate coatings onto oxidized titanium surfaces. In such a process, the surface is initially activated in its metal oxide layer, and a coating then deposited with bioactive materials. The resultant bioactive metal oxide composite coatings may exhibit enhanced tissue integration and resistance to corrosion. More recently, polymeric materials have been increasingly evaluated for their application as implantable biomaterials. Polymeric substrates have been further modified and coated with titania to enhance their biocompatibility. These modifications have included sputter-coating, vapor deposition and plasma spraying for the application of titanium and other metals to enhance the cellular response. Additionally, recent studies have utilized nanoscale $TiO_2$ coatings to further enhance the cellular response. Therefore, polymeric surfaces have been further coated and augmented with nano-features by different techniques including ionic plasma deposition, nitrogen ion immersion plasma deposition, and physical vapour deposition.

Unfortunately, the aforementioned complex processes often involve multi-step techniques, typically require stringent conditions that limit product performance, and can require solution-phase processing with costly and potentially harmful solvents. Furthermore, in the case of coatings that involve multiple layers, the interface that lies between adjacent surface modifications may be weak and susceptible to failure.

SUMMARY

Biocompatible polymeric coating compositions having nanoscale surface roughness and methods of forming such coatings are described herein. A polymeric biocompatible coating may be produced using a powder coating method, where one or more thermosetting polymer resins and one or more biocompatible materials are mixed and extruded, ground into microscale particles, and mixed with nanoparticles to form a dry powder mixture that may be coated onto a substrate according to a powder coating method. Alternatively, the thermosetting polymeric resin can be first extruded and ground into microscale particles, and then mixed with the biocompatible materials in particular form of nanoscale to microscale in size, and then further mixed with nanoparticles to form a dry powder mixture for coating. Bioactive materials may also be selectively added into the polymeric coating in a similar way as the biocompatible materials, either before or after the extrusion, to form a bioactive polymeric coating.

Accordingly, in one aspect, there is provided a polymeric biocompatible coating layer comprising a thermosetting polymer, a biocompatible material and nanoparticles, wherein the coating layer has a surface roughness on a nanometer scale.

In another aspect, there is provided a method of producing a biocompatible coating on a substrate, the method comprising the steps of: preparing a powder mixture comprising a thermosetting polymer resin, a biocompatible material, and nanoparticles; spray coating the powder mixture onto the substrate; and curing the powder mixture to obtain the biocompatible coating on the substrate.

In another aspect, there is provided a powder mixture comprising: a first powder comprising microscale polymeric particles comprising a thermosetting polymer resin, and a biocompatible material; and a second powder comprising nanoparticles.

In another aspect, there is provided a biocompatible implant comprising: a substrate; and a polymeric coating layer adhered to the substrate; wherein the polymeric coating layer comprises a thermosetting polymer, a biocompatible material and nanoparticles, wherein the coating layer has a surface roughness on a nanometer scale.

A further understanding of the functional and advantageous aspects of the disclosure can be realized by reference to the following detailed description and drawings.

BRIEF DESCRIPTION OF THE DRAWINGS

Embodiments will now be described, by way of example only, with reference to the drawings, in which:

FIG. 2 (c) shows the surface distribution of elemental titanium, which was mapped concurrently during the EDX analysis of the PPC. An even dispersion of titanium was seen on PPC-2, -3, and -4. Shown here is a representative mapping of the surface titanium on PPC-4.

FIG. 3(b) shows results after 72 h, revealing a few cells and cellular extensions on PPC-1; several cells spread out onto PPC-2 and -3; and numerous attached and well spread out cells on PPC-4. (Scale bar=100 mm).

FIG. 11(b) shows results obtained after 1 week in osteogenic media, where conventional RT-PCR analysis detected the expression of the Runt-related transcription factor 2 (RUNX2) and type I collagen (COL1A1) in all of the cultures. The levels of Runx2 and collagen were lower on PPC-1. ALP and BSP were detected on PPC-3 and -4, and on cpTi. GAPDH served as the control.

FIG. 12(b) shows results also obtained after 1 week in osteogenic media, where real-time RT-PCR analysis detected the expression of type I collagen (COL1A1) in all of the cultures. The levels of collagen were lowest on PPC-1 and highest on cpTi.

DETAILED DESCRIPTION

Figure 1:
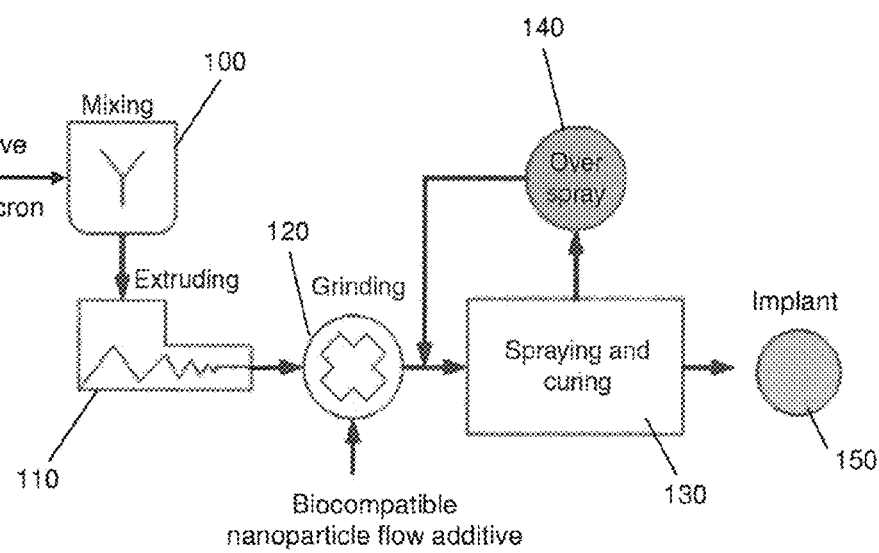
FIG. 1 is a system level diagram illustrating the production of a biocompatible nanostructured composite coating, where (a) shows the primary components of the system, and (b) illustrates the formation of the coating using a spray gun.
Figure 1:
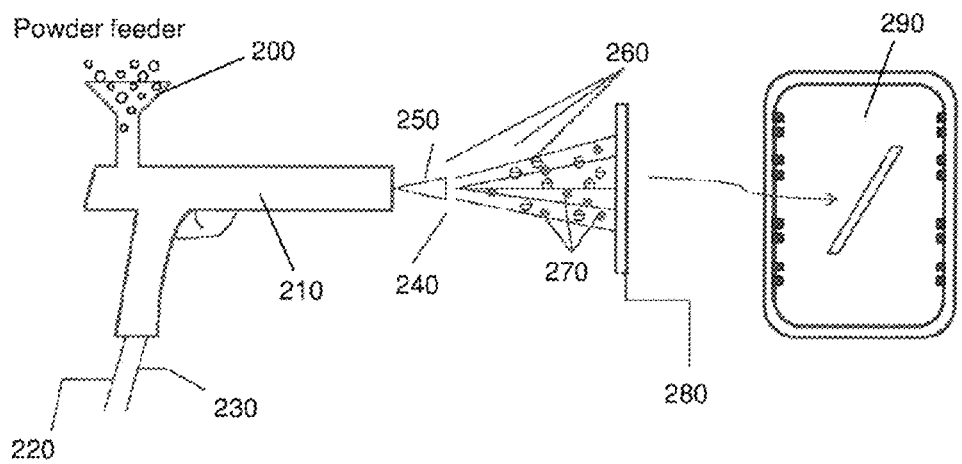

Various embodiments and aspects of the disclosure will be described with reference to details discussed below. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure.

As used herein, the terms, "comprises" and "comprising" are to be construed as being inclusive and open ended, and not exclusive. Specifically, when used in this specification including claims, the terms, "comprises" and "comprising" and variations thereof mean the specified features, steps or components are included. These terms are not to be interpreted to exclude the presence of other features, steps or components.

As used herein, the term "exemplary" means "serving as an example, instance, or illustration," and should not be construed as preferred or advantageous over other configurations disclosed herein.

As used herein, the terms "about" and "approximately", when used in conjunction with ranges of dimensions of particles, compositions of mixtures or other physical properties or characteristics, are meant to cover slight variations that may exist in the upper and lower limits of the ranges of dimensions so as to not exclude embodiments where on average most of the dimensions are satisfied but where statistically dimensions may exist outside this region. It is not the intention to exclude embodiments such as these from the present disclosure.

As used herein, the term "implant" refers to a variety of implants in organisms for replacing and/or repairing tissues and organs. Such implants may include, but are not limited to, orthopedic implants and dental implants, and may be formed from substrates made from metals, alloys, inorganic materials (such as ceramics), and organic materials (such as synthetic polymers).

As used herein, the term "biocompatible" refers to a material that supports the viability of cells or tissues attached or otherwise supported on a surface thereof.

As used herein, the term "bioactive" refers to a biocompatible material that is suitable for promoting the growth of cells on a surface thereof. A non-limiting example of a bioactive material is an implantable substrate that can stimulate tissue regeneration after implantation within a biological organism.

As used herein, the term "nanosized particles" refers to particles having a mean particle size (diameter) in a range between about 1 to about 100 nanometers.

As used herein, the term "submicron sized particles" refers to particles having a mean particle size (diameter) in a range between about 100 nanometers to about 1 microns.

As used herein, the phrase "micron sized particles" refers to particles that have a mean particle size (diameter) that is in a range between about 1 to 100 micrometers.

Disclosed herein are biocompatible polymeric coating compositions having nanoscale surface roughness, and methods of forming such coatings. The polymeric biocompatible coating may be produced using a powder coating method, where one or more thermosetting polymer resins and one or more biocompatible materials are mixed and extruded, ground into microscale particles, and mixed with nanoparticles to form a dry powder mixture that may be coated onto a substrate according to a powder coating method. Alternatively, the thermosetting polymeric resin can be first extruded and ground into microscale particles, and then mixed with the biocompatible materials in particular form of nanoscale to microscale in size, and then further mixed with nanoparticles to form a dry powder mixture for coating. Rather than forming the nanoparticles as a coating on an already formed polymer layer, the compositions disclosed herein incorporate both nanoparticles and biocompatible particles throughout the structure of a polymeric coating layer. Bioactive materials may also be selectively added into the polymeric coating in a similar way as the biocompatible materials, either before or after the extrusion, to form a bioactive polymeric coating.

As will be described in further detail below, in one embodiment, the incorporation of biocompatible and/or bioactive materials into a powder mixture, where the powder mixture subsequently forms a biocompatible powder coating after application and curing, has been shown to provide a surface coating that does not reject or inhibit the viability of cells, such that cell growth is not rejected or inhibited by the presence of the coating. Furthermore, the incorporation of bioactive material into the coating has been observed to promote cell growth.

The polymeric coating may be formed using the spray coating method. As shown below, the composite coating obtained through the powder coating step provides a surface coating that supports adherent cells, such as mesenchymal cells. Such a coating may be provided on an implant, such as an implantable substrate, structure, or device; or to a component or portion of an implantable substrate, structure, or device, to form a biocompatible surface for cell attachment and growth after, and optionally, before, implantation. In selected embodiments, particles formed from a bioactive material may also be incorporated into the coating in order to provide a surface that favors and/or stimulates the growth or proliferation of adhered cells.

The thermosetting polymer may be formed from a thermosetting polymer resin or a resin adhesive. For example, the thermosetting polymer may be formed from a resin with strong adhesion properties, such as epoxy resin or a polyacrylic acid resin. In other examples, the polymer may be polyurethane, polyester, or mixtures thereof. In one example, the polymer resin is selected to be suitable for producing a powder that may be dry blended with nanoparticles prior to application onto a surface for forming the coating, where the polymer resin may be cured after application to form the composite coating.

As will be shown below, the nanoparticles may improve the surface morphology of the coating layer for cytocompatibility. Without intending to be limited by theory, it is believed that nanoparticles, which are mixed into the powder prior to forming the powder coating composition, can assist in forming nanoscale morphology on implant surfaces, so as to improve the biocompatibility of the coating.

In one example, the nanoparticles can account for 0.1-10% of the total coating weight. In other examples, the nanoparticles can account for 0.5-2% of the total weight, while in other examples, the nanoparticles can account for 2-5% of the total weight. Advantageously, coating compositions disclosed herein include nanoparticles that are integrated into the surface structure of the coating. This can be effective in providing biomimetic surfaces for cell attachment and proliferation, where the biomimetic surface exhibit surface roughness on a nanometer scale.

Biocompatible nanoparticles are suitable for providing a coating that is characterized by nanoscale surface roughness while maintaining a biocompatible composition. However, in some examples in which the nanoparticles are provided with a suitably low concentration, non-biocompatible nanoparticles may also be employed, provided that the chosen nanoparticulate materials have a positive effect on the formation of nanoscale morphology on implant surfaces. In another example, a combination of biocompatible and non-biocompatible nanoparticles may be employed.

In one embodiment, the nanoparticles are metal oxide nanoparticles. Selected examples of metal oxide nanoparticles include titania, silica, or alumina nanoparticles. The nanoparticles may also be core-shell nanoparticles, where the shell may be formed from a biocompatible material.

As described above, the surface coating composition includes a biocompatible material. The biocompatible material can account for 1-50% of the total weight. In some embodiments, the biocompatible powder can account for 10-30% while in some other embodiments, biocompatible material can account for 10-20%. Biocompatible materials used in the coating composition include bio-inert ceramics, such as oxide ceramics, $Si_3N_4$ ceramics, glass ceramics, carbon materials; biomedical metallic materials and metal oxides such as titanium, titanium alloy, titanium dioxide, cobalt oxide, calcium oxide, and zirconia. In some embodiments, biocompatible material can be titanium dioxide or titanium.

The polymer coating composition can further include bioactive materials. In this case, polymers are evenly mixed with a bioactive powder to form microscale powders, which can enhance the biocompatibility of the coating. Bioactive composites themselves can further enhance the biocompatibility as well as the bioactivity of coatings formed herein. Bioactive materials used in the coating composition can include, but are not limited to, ceramic materials, such as calcium phosphate-based bio-ceramics, tricalcium silicate, dicalcium silicate, calcium hydroxide; as well as MTA (mineral trioxide aggregates). Bioactive materials can account for 0.1-20% of the total weight. In some embodiments, the bioactive material composition can account for 1-10% while in some other embodiments, the bioactive materials can account for 5-10%.

In one example, the polymer coating composition includes a thermosetting polymer with a concentration of approximately 30 to 90% wt., nanoparticles with a concentration range of approximately 0.1 to 10% wt., a biocompatible material with a concentration range of approximately 1 to 50% wt., an optional bioactive material with a concentration range of 0 to 20% wt., and additional components including fillers, degassers, and curing agents. In another example, the thermosetting polymer may be provided with a concentration range of approximately 40 to 75% wt. or approximately 50 to 65% wt.

In another example, the polymeric coating composition is a composite structure, where the composition includes a thermosetting polymer with a concentration of approximately 55% wt., metal-oxide nanoparticles with a concentration range of approximately 0.5-2% wt., a titanium-based biocompatible material with a concentration range of approximately 10-25% wt., and other materials including fillers, flow agent, curing agent. In another example, the coating composition is a composite porous structure that includes a thermosetting polymer with a concentration of approximately 55% wt., metal-oxide nanoparticles with a concentration range of approximately 0.5-2% wt., a titanium-based biocompatible material with a concentration of approximately 25% wt., a bioactive material with a concentration range of approximately 1-10% wt., and other materials including fillers, flow agent, curing agent.

In another example, the coating composition may further include submicron polymer particles, such as submicron polytetrafluoroethylene (PTFE) particles. For example, the coating composition may include approximately 0.1-3.0% wt. PTFE particles with a mean particle diameter on the submicron scale (for example, approximately 200 nm). As shown below in the Examples, the inclusion of submicron particles in the coating composition can be useful in controlling the surface roughness of the coating. For example, it is shown below that the incorporation of submicron PTFE particles increased the surface roughness from 51 nm to approximately 270 nm for concentrations of 1% wt. and 3.0% wt. PTFE, respectively. Moreover, in Example 3 provided below, for example, it was found that the dependence of surface roughness on the concentration of submicron PTFE particles followed an approximate square law dependence for PTFE concentrations in the range of 0-3% wt.

Other additives can be added to the coating compositions described in the present disclosure, such as organic pigments, including organic red, organic yellow, fillers such as barium sulfate; as well as other additives, such as flow agents and degassing agents. Those skilled in the art will appreciate that the selection and concentration of additives will depend on the specific application for which the coating is prepared.

Referring now to FIG. 1(a), an example system level diagram is provided that illustrates a method of forming a biocompatible powder coating composition on a substrate. A mixture is first formed by mixing together a thermosetting polymer resin, a biocompatible material, and additives such as curing agents, degassing agents, and filler, as shown at step 100. The mixture is passed through an extruder at step 110, and then cooled and crushed to form chips that contain the polymer mixture and the biocompatible material. The chips are then ground into the desirable microparticles, each of the composite particles having the different constituents, which in one example may have a diameter between 10 to 100 microns, and blended with the nanoparticles, as shown at step 120. The blending step may be achieved by high shear mixing, which can be beneficial in breaking up agglomerates. The resulting microscale-nanoscale powder mixture can then be spray coated (step 130) onto a substrate, such as a biomedical implant 150. The over spray may be recovered as shown at step 140.

In one example, the powder mixture formed prior to the coating step may involve relative particle sizes and/or densities as disclosed in U.S. Pat. No. 6,833,185, titled "Fluidization Additives to Fine Powders", which is incorporated herein by reference in its entirety. For example, the microparticles may be characteristic of a Group C powder and may be fluidized by providing nanoscale flow aid.

As shown in FIG. 1, a bioactive material may also be added to the initial mixture that is formed in step 100 prior to the extrusion process. In an alternative example, the biocompatible materials and/or bioactive materials can be first made into nanoscale to microscale sized particles (for example, through suitable processing such as grinding) and then post-blended with the microscale particles obtained after the extrusion and grinding steps. In this case, the post-blending step may be performed as a single post-blending step where the nanoscale particles are also blended.

Although the nanoparticles have been described above as being blended with the particles obtained after the extrusion and grinding steps, it is to be understood that the nanoparticles may be added into the polymeric resin mixture prior to the extrusion step, or post-blended in after the extrusion, or both.

In another variation of the above method, submicron polymer particles may be mixed with the initial mixture (formed at step 100) prior to extrusion and/or the blended coating powder obtained after grinding. As noted above, the inclusion of submicron particles can be effective in controlling (for example, increasing), the surface roughness of the coating.

In one example method, the surface roughness may be controlled as follows. A series of coatings, each with different concentrations of submicron polymer particles, may be formed and analyzed to determine the corresponding dependence of surface roughness on polymer concentration. The measured dependence (which may be fitted, for example to a calibration curve, or provided as a look-up table), may then be employed to select an appropriate concentration of polymer to obtain a desired surface roughness.

FIG. 1(b) shows the process of applying the coating composition powder onto a surface such as that of a biomedical implant. In the process, after an even and complete mixture of the nanoparticles and the microscale polymeric and biocompatible coating powders, the powder mixtures are sprayed onto implant surfaces by an electrostatic spraying gun followed by a suitable curing treatment (for example, a thermal treatment or a UV radiation treatment) at an appropriate curing temperature. The coating composition is then cured on the implant surfaces to form the biocompatible coatings with a strong bonding to the implant surfaces.

The coating powder is first provided to a powder feeder 200, which feeds the power mixture to the electrostatic spray gun 210, which is powered by high voltage cable 220 and air line 230. During activation, a space charge 240 is formed at the gun tip 250, resulting in charged powder particles 260 and free ions 270 towards grounded substrate 280. The powder coating on substrate 280 is then cured in thermal chamber 290.

There are several methods for applying the powder mixture onto implants or other substrates to form biocompatible coatings, for which the aforementioned powder coating method is merely one example. For example, conventional powder coating techniques such as via corona electrostatic spraying techniques can be used to form coatings after grounding the compositions into fine powders. One can also use conventional liquid coating technique after converting the compositions into liquid, or dissolving or suspending in certain liquids. There are also other powder coating methods available for powder coating.

As noted above, the coating compositions described herein may be formed on the surface of a wide range of substrates, including biomedical implants, and implantable biomedical devices. For example, the methods described above may be performed by applying a powder coating onto the surface of a biomedical implant, and subsequently curing the coating to form a biocompatible coating onto the implant.

The coatings described above may be applied to a wide range of implants and implantable devices, including, but not limited to, dental implants and hip replacement implants.

While the preceding description has focused on the formation of coating compositions on implants, it is to be understood that the coating composition may be applied to other objects and surfaces to form biocompatible and/or bioactive surface coatings. Suitable objects may include culture vessels and surfaces, such as substrates for the in-vitro culturing and/or incubation of cells. Such substrates may be provided as single open substrates, or may be provided as a plurality of substrates arranged within a common monolithic structure, such as the surfaces of a plurality of wells within a microplate or a microarray device.

The following examples are presented to enable those skilled in the art to understand and to practice embodiments of the present disclosure. They should not be considered as a limitation on the scope of the present embodiments, but merely as being illustrative and representative thereof.

EXAMPLES

Example 1

Studies of Nano-$TiO_2$ Enriched Polymeric Powder Coatings Supporting Human Mesenchymal Cell Attachment and Growth Preparation of Polymeric Powder Coatings Polymeric powder coatings (PPC) were prepared according to the methods described above. Either Avalanche white PE (Links Coating, London, Canada) (PPC-2, -3 and -4), or Epoxy resins (Links Coating, London, Canada) (PPC-1) were combined with filler, flow agent, and degassing agent and curing agent. These mixtures were processed through a twin-screw extruder (Donghui Powder Processing Equipment Co., Yantai, China) to create chips that were then ground into powder particles (15-20 mm). The fine powders were then mixed with nano-sized PTFE (3%), which served to increase the surface roughness of the final coatings. Then, either titanium dioxide ($TiO_2$; Degussa, USA; PPC-3 and -4), or silica ($SiO2$; Degussa, USA; PPC-1 and -2) nano-particles were added through high-shear mixing. Due to the high shear mixing, the agglomerates of both the nano and micron-sized particles were broken up, and some nanoparticles took place in between the micron-sized particles. Thus they served to increase the separation distance between the micron-sized powder coating particles, and thereby ensured an adequate flow of the ultrafine mixture. Without these nano-additives, the ultrafine powder particles (15-20 um) would agglomerate significantly and hinder flow.

Finally, the powder mixtures (Table 1) were passed through a sieve (32 um) to remove oversized particles, and then fed through a hopper to the tip of a spray gun. As the spray gun was activated, a voltage was applied to ionize the particles that were then sprayed onto sheets of aluminum that were grounded. Subsequently, the powder-coated sheets were cured (at 2008 C for 10 min), and then cut into circular discs (R=7.5 mm).

TABLE 1

Coating Formulations Employed in Examples 1 and 2

| Coating | Base coating | Additive | Embedded $TiO2$ (wt. %) | Added $TiO2$ (wt. %) |
|---|---|---|---|---|
| PPC-1 | Epoxy + PTFE | $nSiO_2$ | 0 | 0 |
| PPC-2 | Avalanche white polyester + PTFE | $nSiO_2$ | 25 | 0 |
| PPC-3 | Avalanche white polyester + PTFE | $nTiO_2$ | 25 | 0.5 |
| PPC-4 | Avalanche white polyester + PTFE | $nTiO_2$ | 25 | 2.0 |

Adhesion to Substrate

The adhesion of the PPC to the underlying substrate was confirmed with an Elcometer 107 Cross Hutch Cutter (Elcometer Ltd., Windsor, Canada). The coatings were cut down to the substrate with a blade (11×1.5 $mm^2$), as recommended by ASTM D3359, and several perpendicular cuts were made to create a grid of small squares. This lattice was brushed to remove debris, covered with adhesive tape (ASTM standard), and firmed with a pencil eraser. The tape was then withdrawn by a single smooth pull, and the remaining grid squares compared for retention. The lattice was then assessed for adhesion by using the ASTM D3359 standards.

Surface Topography

The surface topography of the PPC was assessed by scanning electron microscopy (SEM). The PPC surfaces were mounted on metal stubs with the aid of adhesive carbon tape and were sputter coated with gold (10 nm), and then carefully examined with a Hitachi S-4000 (Hitachi, Pleasonton, Calif.) SEM. The working voltage (15 kV), beam (60) and working distance (5.2 mm) were set.

Elemental Analysis and Ti Mapping

The elemental composition of the PPC surfaces was analyzed by energy dispersive X-ray spectroscopy (EDX) equipped with Hitachi S-4000 SEM. The PPC surfaces were mounted on metal stubs and sputter coated with gold (10 nm) as detailed above. The working voltage (15 kV), beam (60)

and working distance (15 mm) were set. The EDX analyses quantified nearly all the elements with a minimum detection limit of 0.0 wt %. These analyses were repeated at three separate locations on each surface and mean surface concentrations of carbon and titanium were reported. In addition, mapping of elemental Ti on PPC-4 was performed by EDX to visualize the actual distribution of Ti over the entire surface. While doing Ti mapping, sample was loaded as same as they were loaded for SEM and elemental EDX, only different mode of operation was selected to get the elemental mapping.

Surface Roughness

The surface roughness of the PPC was measured with a Dektak 8 Stylus Surface Profiler (Veeco Metrology Group, Santa Barbara, Calif.). The PPC were loaded onto a high precision stage that moved beneath a diamond-tipped stylus according to specified scan length (20 mm), scan resolution (1.111 mm/sample) and stylus force (8 mg). Each PPC surface was scanned at 10 different locations to measure vertical features. The mean deviation of the vertical features from the centerline was then calculated as a measure for surface roughness (Ra).

The surface topographies of the PPC surfaces were examined by atomic force microscopy (AFM). Each PPC surface was analyzed with the dynamic force mode AFM (Park Systems AFM XE-100) by using a silicon cantilever to detect surface features. The spring constant and the nominal tip radius of the silicon cantilever were ~40 N m-1 and 10 nm, respectively. The length, width and thickness of the cantilever were 125, 40 and 4 µm, respectively. The cantilever was oscillated around its resonant frequency (~300 kHz) and its amplitude decreased when the tip interacted with the sample surface. This damped amplitude (set point) provided a feedback parameter for probing surface features.

The surface porosity was calculated from scanning electron microscopy (SEM) images by using Image J software to manually mark individual pores and cavities with the 'freehand drawing' tool in the software as previously described [37]. The total area of these pores as a proportion of the total area of the sample provided a measure of surface porosity.

Disinfection and Sterilization

The PPC surfaces and cpTi were disinfected and sterilized in preparation for tissue culture. The PPC and cpTi disks were rinsed twice with ethanol (70%), washed thrice with phosphate buffered saline (PBS) and then placed into individual wells of a 24-well tissue culture plate. The entire plate of disks were then placed in a tissue culture hood and exposed to UV light for 30 min to ensure sterility.

Cell Culture

Human embryonic palatal mesenchymal cells (HEPM, ATCC CRL-1486) were seeded onto cpTi and PPC in multiple 24-well tissue culture plates (50,000 cells/well). The cultures were maintained in Dulbecco's modified eagles medium (DMEM) supplemented with fetal bovine serum (FBS, 10%), L-glutamine (2 mmol/ml), penicillin G (100 U/ml), streptomycin sulfate (100 ug/ml) and amphotericin B (0.25 ug/ml). Replicate cultures were incubated at 378 C for 24 and 72 h and then harvested for analysis. Additional cultures were seeded at a higher cell density (100,000 cells/well) to identify extracellular matrix formation over 72 h.

Cell Surface Interactions

After each incubation period the replicate PPC disks were collected, washed three times with PBS, fixed with glutaraldehyde (2.5%) in cacodylate buffer (100 mM) for 20 min, dehydrated in ascending grades of ethanol (25%, 50%, 75%, 95%, and 100%) and immersed in hexamethyldisilazane. Then the surfaces were air dried, mounted on metal stubs, sputtered with gold (20 nm) and examined with a Hitachi S-4000 SEM as detailed above. The working voltage (5-12 kV), beam (60) and working distance (5.3 mm) were set.

Cell Morphology and Cytoskeletal Organization

After 72 h of growth on titanium and PPC surfaces the cultures were harvested and washed thrice with PBS. The cells that were attached to the surfaces were fixed with paraformaldehyde (4% for 10 min) and permeabilized with Triton X-100 (0.1% for 5 min). The actin filaments of the cytoskeleton were labeled with rhodamine phalloidin (Cytoskeleton, Denver, Colo.) for 2 h at room temperature. The surfaces were then mounted using Vectashield with DAPI (Vector Laboratories, Burlingame, Calif.) and examined by an inverted fluorescence microscope (Axiovert 40 CFL, Carl Zeiss Canada Ltd., Toronto, Canada) with the magnification of 20×.

Cell Attachment Assay

HEPM cells were seeded onto titanium disks and PPC surfaces in multiple 24-well tissue culture plates (20,000 cells/well). After 24 and 72 h of cell attachment and growth, triplicate cultures were harvested from each surface, and carefully rinsed with PBS to remove unattached cells. Then, trypsin (150 ul) was added to each well and the culture plates were incubated (378 C for 5 min) to release the attached cells. These cells were collected and counted in a hemocytometer.

Gene Expression on PPC Surfaces

The cells that attached and spread out onto the PPC surfaces were analyzed for their expression of key marker genes through RT-PCR analysis. HEPM cells (200 000 cells/well) were seeded onto replicate cpTi, PPC-1, -2, -3 and -4 disks in multiple 6-well tissue culture plates. After 24 h, ascorbic acid (50 µmol ml−1) and β-glycerophosphate (10 µmol ml$^{-1}$) were added to the media to induce osteogenic differentiation.

At 24 h, and after 1 week of growth and differentiation in osteogenic media, replicate cultures were harvested for the analysis of gene expression. The cultures were gently rinsed three times with PBS to remove unattached cells and the total cell RNA was extracted with an RNeasy Mini kit (Qiagen, Valencia, Calif.) according to the manufacturer's instructions. The cells were resuspended in lysis buffer and homogenized by passage through a QIAshredder column (Qiagen). The homogenized lysate was then applied to the RNeasy column, rinsed repeatedly with a series of buffers (RLT), and eluted into RNase-free deionized water. These RNA extracts were stored at −70° C. Aliquots of the RNA extracts were diluted in deionized water and examined with a bioanalyzer (Agilent Technologies, Wilmington, Del.) to measure concentration and ensure purity.

These extracts were subjected to conventional RT-PCR analysis with human-specific primers (Table 3) for Runt-related transcription factor 2 (RUNX2), type I collagen (COL1A1), alkaline phosphatase (ALP), bone sialoprotein (BSP) and glyceraldehyde 3-phosphate dehydrogenase (GAPDH), as previously reported [38]. The RNA was reverse transcribed into cDNA with Oligo(DT) primer and SuperScript™ II RNase H Reverse Transcriptase at 42° C. for 50 min. The specific transcripts were then amplified in separate tubes by PCR with gene-specific primers and Platinum® Taq DNA polymerase. The thermal cycling parameters were 94° C. for 2 min to activate the polymerase, followed by 40 cycles of 94° C. for 30 s, 50° C. for 30 s and 72° C. for 1 min. The RT and PCR reactions were performed in an Amplitron® II thermocycler (Barnstead Thermolyne, Dubuque, Iowa). The PCR products were separated on an agarose gel (1%) containing ethidium bromide (0.05 µg ml$^{-1}$), visualized on a transilluminator (Fisher, Pittsburgh, Pa.) and photographed with a digital camera (Panasonic, Japan).

TABLE 3

Primers for Conventional RT-PCR

| Gene | Primer | DNA sequence | Product |
|---|---|---|---|
| BSP | Forward | 5'-GGCCTGTGCTTTCTCAATG AA-3' | 96 bp |
| | Reverse | 5'GCCTGTACTTAAAGACCCCA TTTTC-3' | |
| RUNX2 | Forward | 5'-ATGCTTCATTCGCCTCACA AAC-3' | 261 bp |
| | Reverse | 5'-CCAAAAGAAGTTTTGCTGA CATGG-3' | |
| COL1A1 | Forward | 5'-GCAAGAACCCCAAGGACAA GAG-3' | 306 bp |
| | Reverse | 5'-TCGTGCAGCCATCGACAGT GAC-3' | |
| ALP | Forward | 5'-CACGGGCACCATGAAGGAA AAG-3' | 341 by |
| | Reverse | 5'-TGGCGCAGGGGCACAGGAG ACT-3' | |
| GAPDH | Forward | 5'-TCCTGCACCACCAACTGCT TAGC-3' | 345 bp |
| | Reverse | 5'-CGCCTGCTTCACCACCTTC TTG-3' | |

The 1 week extracts were also analyzed by quantitative real-time RT-PCR with real-time primers and probes (Table 4) for RUNX2 and COL1A1, as previously reported. Triplicates of each RNA extract were analyzed by quantitative real-time multiplex RT-PCR, with the aid of the TaqMan Gold RT-PCR kit (Perkin Elmer, Foster City, Calif., USA). The TaqMan Ribosomal RNA Control Reagents kit (Perkin Elmer) was used to detect 18 s ribosomal RNA (Applied Biosystems Kit 4310893E) as an endogenous control. The real-time PCR reactions were conducted in 96-well optical reaction plates (Applied Biosystems) in an ABI Prism 7700 Sequence Detection System. The Runx2, type I collagen and endogenous rRNA control were amplified by multiplex PCR with thermal cycling parameters of 50° C. for 2 min, 95° C. for 10 min, 40 cycles of 95° C. for 15 s and 60° C. for 1 min, using TaqMan Universal PCR Master Mix (Applied Biosystems). The steady-state mRNA levels were normalized to 18 s rRNA, and the levels on different substrates were then normalized to the cpTi control surfaces.

TABLE 4

Primers and Probes for Real-Time RT-PCR

| Gene | Primer/ probe | DNA sequence |
|---|---|---|
| RUNX2 | Forward | 5'-CAACAAGACCCTGCCCGT-3' |
| | Real-time probe | 5'-CTTCAAGGTGGTAGCCC-3' |
| | Reverse | 5'-TCCCATCTGGTACCTCTCCG-3' |
| COL1A1 | Forward | 5'-ACAGCCGCTTCACCTACAGC-3' |
| | Real-time probe | 5'-TGTCGATGGCTGCACGAGTCACAC-3' |
| | Reverse | 5'-GTTTTGTATTCAATCACTGTCTTGCC-3' |

Figure 11:
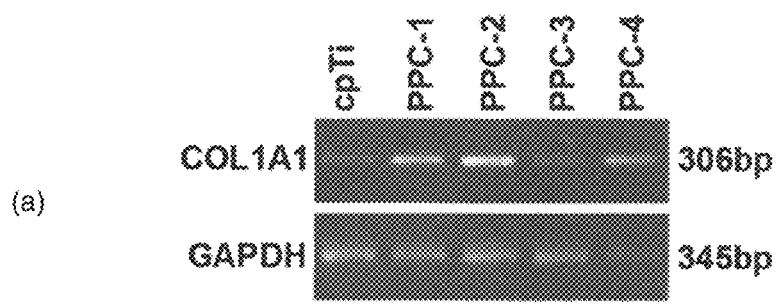
FIG. 11 shows (a) RT-PCR results of human mesenchymal cells (HEPM) seeded onto polymeric powder coatings (PPC-1, -2, -3 and -4) and titanium (cpTi) surfaces. After 24 h, conventional RT-PCR analysis detected type I collagen (COL1A1) in all of the cultures. GAPDH served as the control.
Figure 11:
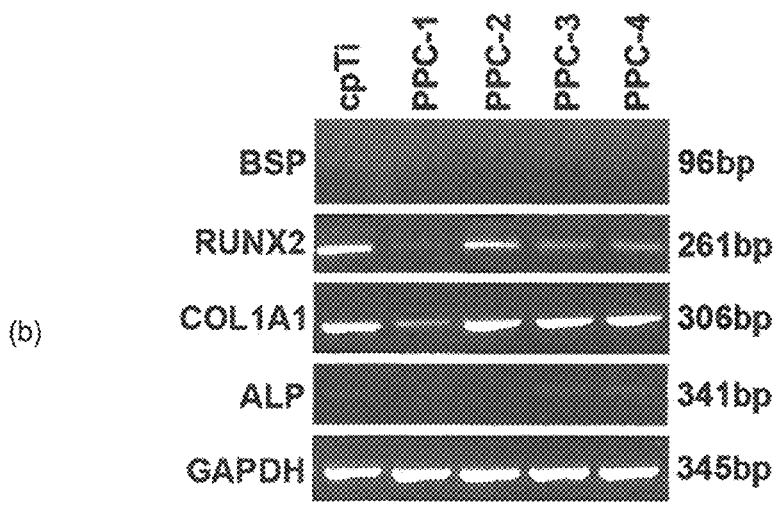

Conventional RT-PCR analysis showed that after the initial 24 h of cell attachment and spreading, type I collagen expression was detected in the human mesenchymal cells growing on all of the PPC and cpTi surfaces (FIG. 11(a)). However, the collagen levels appeared to be low, and Runx2, ALP and BSP were entirely undetectable on any of the surfaces. Then after 1 week of osteogenic differentiation, Runx2 was induced, collagen levels were increased, and ALP and BSP were starting to be detectable (FIG. 11(b)). Runx2 and type I collagen were readily detected on all of the PPC and cpTi surfaces, but ALP and BSP could only be detected on PPC-3 and -4, and on cpTi. Furthermore, the Runx2 and collagen levels appeared to be markedly lower on PPC-1 than on PPC-2, -3, -4 and cpTi.

Figure 12:
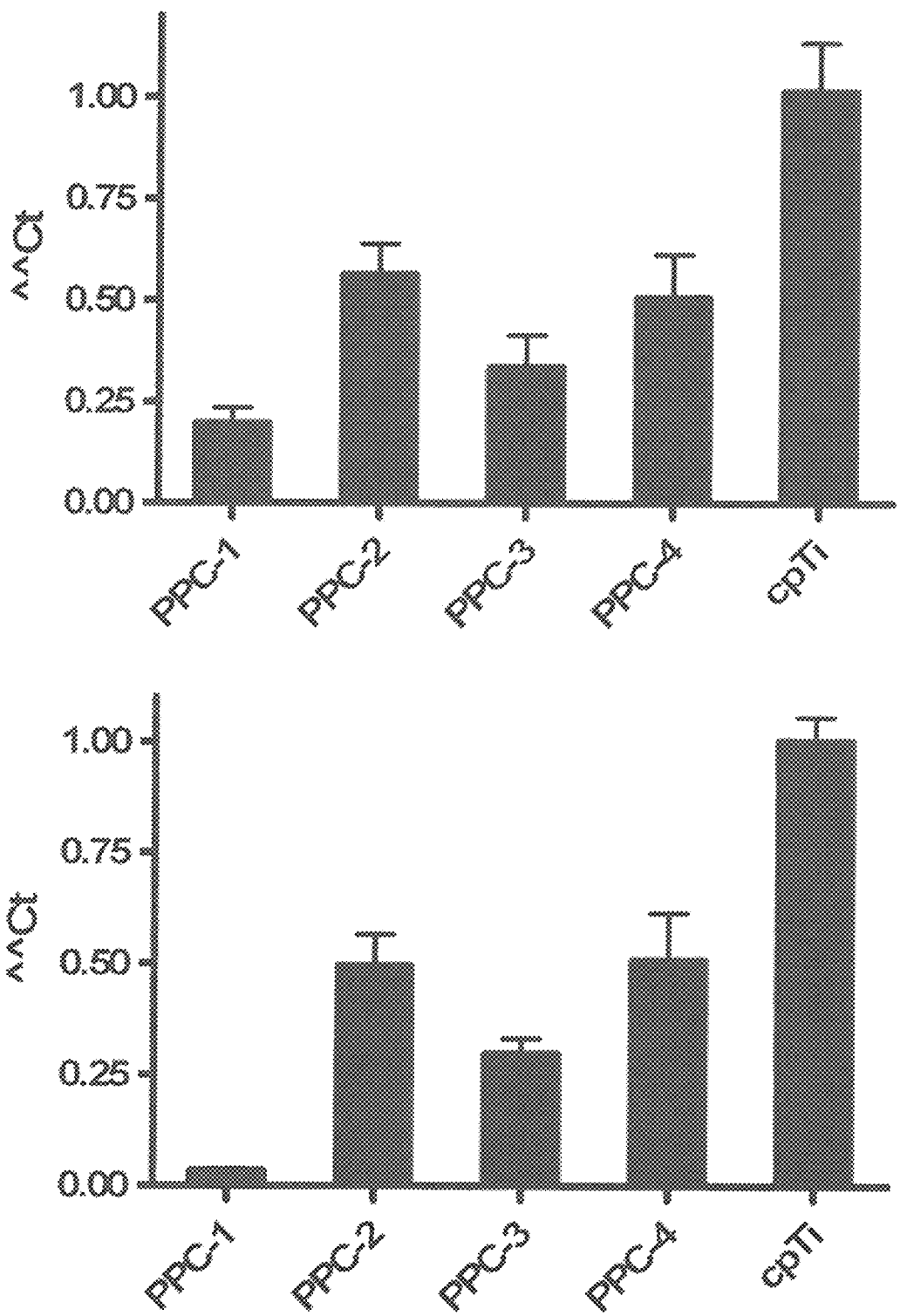
FIG. 12 shows (a) quantitative real-time RT-PCR results obtained after 1 week in osteogenic media, where real-time RT-PCR analysis detected the expression of the Runt-related transcription factor 2 (RUNX2) in all of the cultures. The levels of Runx2 were lowest on PPC-1 and highest on cpTi.

Similarly, quantitative real-time RT-PCR detected Runx2 (FIG. 12(a)) and type I collagen (FIG. 12(b)) mRNA after a week of differentiation on all of the surfaces. For both Runx2 and collagen, steady-state mRNA levels were highest on cpTi, at an intermediate level of expression on PPC-2, -3 and -4, and lowest on PPC-1. Runx2 was significantly higher on cpTi than on PPC-1 ($P<0.001$), PPC-2 ($P<0.05$), PPC-3 ($P<0.01$) and PPC-4 ($P<0.05$), but not significantly different on PPC-1, -2, -3 and -4 ($P>0.05$). The collagen was significantly higher on cpTi than on PPC-1 ($P<0.001$), PPC-2 ($P<0.01$), PPC-3 ($P<0.001$) and PPC-4 ($P<0.01$), not significantly different on PPC-2, -3 and -4 ($P>0.05$), and significantly lower on PPC-1 than on PPC-2 ($P<0.01$) and PPC-4 ($P<0.01$).

Initiation of Mineralization

Cells grown in extended culture on PPC surfaces were stained with Alizarin Red-S to detect the presence of calcific mineral deposits. HEPM cells were carefully seeded as micromass cultures (60,000 cells/10 µl droplet) onto PPC-1, -2, -3 and -4 disks in 24-well tissue culture plates and incubated at 37° C. After 1 h, ascorbic acid (50 µmol ml–1) and β-glycerophosphate (10 µmol ml$^{-1}$) were added to the media to induce osteogenic differentiation. The osteogenic media were replenished biweekly and the cultures were maintained for 4 weeks.

After 4 weeks, the media were discarded and the cultures gently rinsed in PBS. They were then fixed in formalin (10%) for 10 min, rinsed in calcium-free nanopure water and stained with Alizarin Red-S (2%) for 10 min at room temperature. Finally they were rinsed in calcium-free nanopure water and examined for Alizarin Red-stained deposits.

Cell Viability and Metabolic Activity

The same numbers of HEPM cells (20,000 cells/well) were seeded onto titanium and PPC surfaces in multiple 24-well tissue culture plates using the same protocol as in the cell attachment assay. After 24 and 72 h, the cpTi and the PPC surfaces were rinsed with trypsin to release attached cells that were collected and reseeded into multiple 48-well tissue culture plates. After 24 h, MTT reagent (tetrazolium (3-(4,5-dimethylthiazolyl-2)-2,5-diphenyltetrazolium bromide) was added and the cultures were incubated (378 C) for an hour in the dark. The reagents were then carefully replaced with MTT solubilizing solution (acidisopropanol), and the absorbance (570 nm) measured in a Safire Multi-Detection Microplate Reader (Tecan, Austria).

Figure 2A:
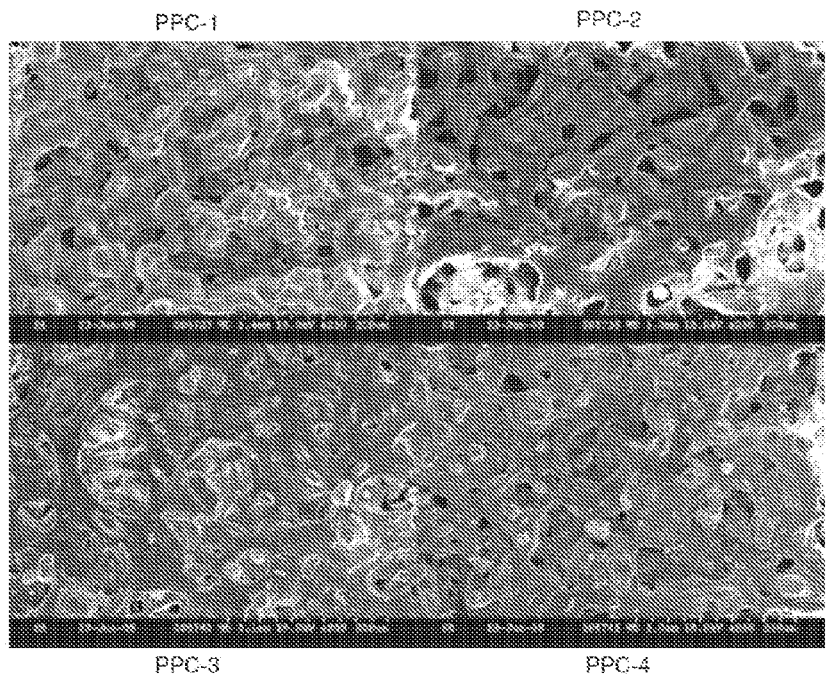
FIG. 2 (a) shows scanning electron microscopy of polymeric powder coatings (PPC-1, -2, -3, and -4). All of the coatings were characterized by outward projections and inward concavities that created rough surface topographies, (scale bar=200 mm); (b) shows energy dispersive X-ray spectroscopy results, where the mean surface concentration of elemental carbon (C) and titanium (Ti) were reported with their standard deviations. Ti was undetected in PPC-1, and was detected at progressively higher levels in PPC-2, -3, and -4.

When polymeric resins were combined with fillers and additives, and processed and applied as described above, PPC were created (FIG. 2). The first coating, PPC-1, contained epoxy resin and PTFE, as well as $nSiO_2$ (~25 nm average diameter) additive to ensure powder flow (Table 2). The second coating, PPC-2, contained titanium embedded PE and PTFE, and again $nSiO_2$ as the additive. Then the third coating, PPC-3, contained titanium embedded PE resin and PTFE, but $nTiO_2$ (~40 nm average diameter) was the additive. Similarly the fourth coating, PPC-4, contained titanium embedded PE resin and PTFE, and $nTiO_2$ additives at a higher concentration.

All of these coatings had high levels of nano-scale surface roughness (as shown in Table 2). The mean roughness ranged from 250 to 280 nm, and was largely similar due to a same amount of PTFE in all of the formulations. The surface roughness of the developed surfaces was within the nanoscale, and was attributed to the $nSiO_2$ and $nTiO_2$ nano-additives that were used in the preparation of PPC-1 and -2, and PPC-3 and -4 respectively.

Figure 8:
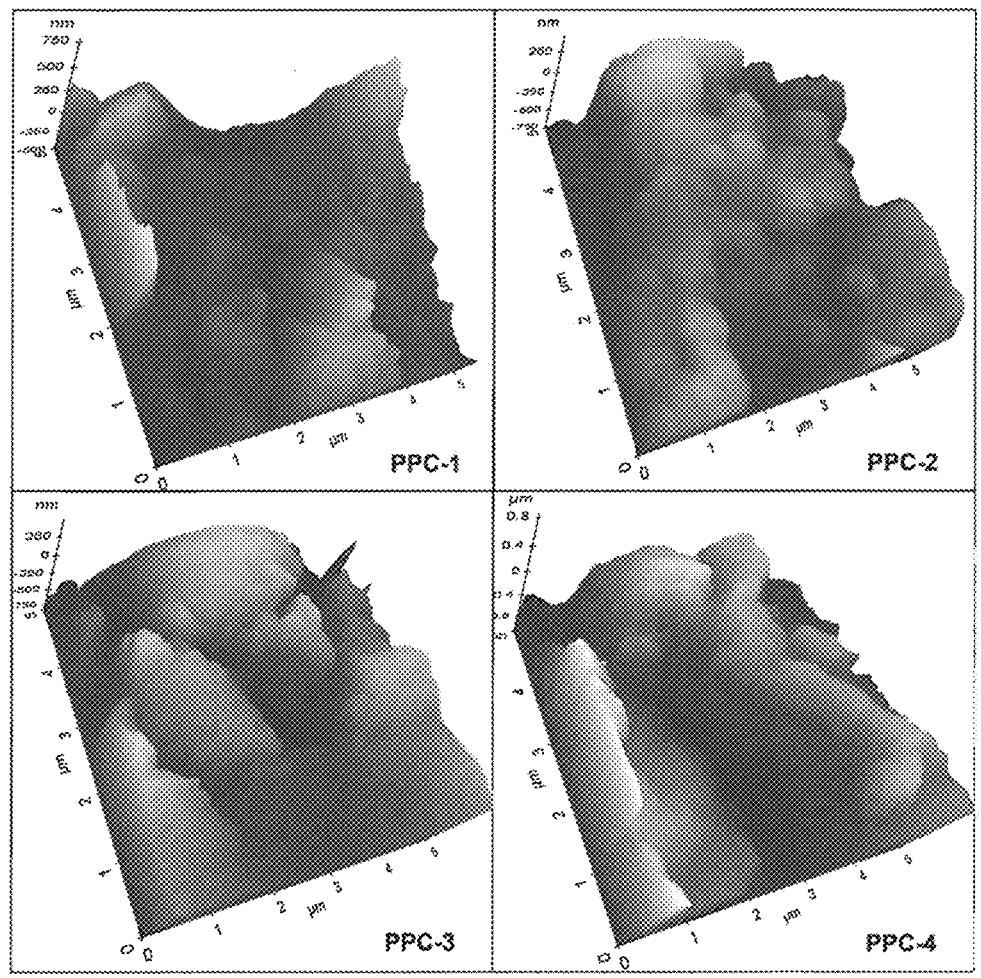
FIG. 8 shows atomic force microscope measurements of polymeric powder coatings (PPC-1, -2, -3 and -4). All of the surfaces had numerous outward projections and inward concavities that created complex micro-topographies. The horizontal axis represents the X- and Y-axes (μm) and the vertical axis represents the Z-axis (nm) (scan size: 5×5 μm).

AFM showed that all of the PPC surfaces had complex micro-nano topographies (FIG. 8). The AFM revealed complicated and elaborate surface topographies that had both micron-sized and nano-scale dimensions. There were numerous surface projections within the nanometer scale, and a labyrinth of underlying concavities that created intricate and elaborate micro-topographies. These concavities created a surface with a similar level of porosity for all of the PPC surfaces (Table 2). Similarly, they produced a high level of surface roughness on all of the PPC (Table 2). The mean surface roughness ranged from 250 to 280 nm and remained within the nano-scale for all of the PPC.

TABLE 2

Surface Roughness of Polymeric Powder Coatings

| Coating | Surface Roughness (nm) | Adhesion* | Porosity (%) |
| --- | --- | --- | --- |
| PPC-1 | 251.3 ± 22.3 | 5B | 24.7 |
| PPC-2 | 268.3 ± 26.9 | 5B | 24.5 |
| PPC-3 | 262.8 ± 18.1 | 5B | 22.3 |
| PPC-4 | 281.9 ± 13.8 | 5B | 26.2 |

*Adhesion was assessed by comparing the lattice of cuts with ASTM D3359 standards from 5B to 0B. 5B corresponds to completely smooth edges of the cuts (i.e., none of the lattice squares were detached).

All of these coatings were highly adherent to their underlying substrate (Table 2). When subject to the standard test for adhesion, all of the PPC samples were found to have excellent adhesion to their substrate. Indeed, none of the lattice squares were dislodged by the tape removal during testing.

Figure 2B:
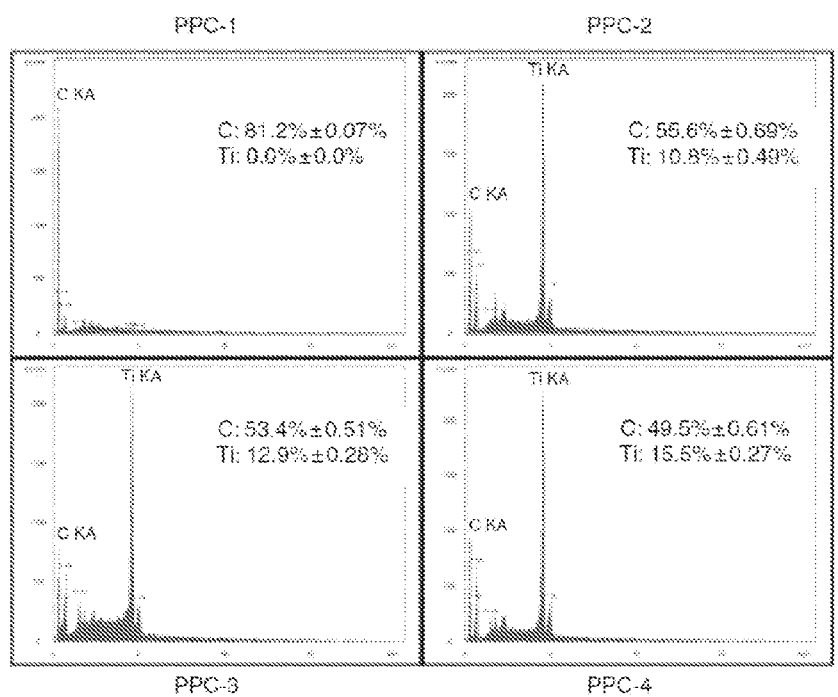
Figure 2C:
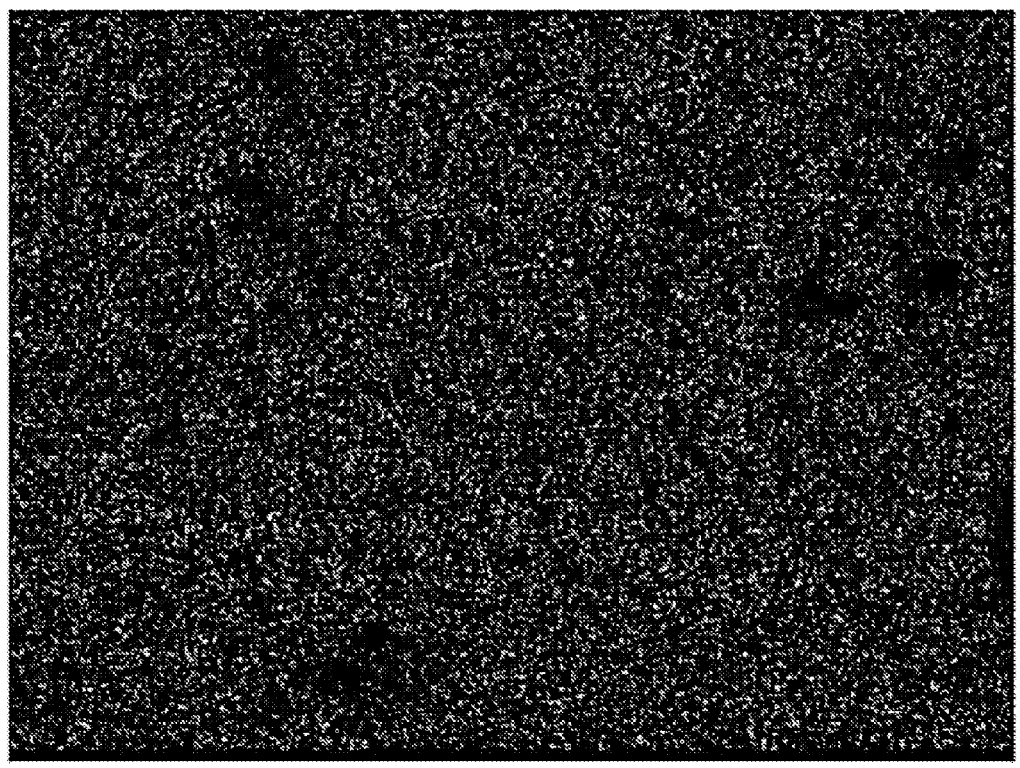

In addition, all of the coating surfaces had fairly similar elemental compositions, with the exception that PPC-1 lacked titanium (FIG. 2(b)). The titanium was readily detected in PPC-2, -3 and -4 due to its incorporation in their formula; whereas titanium was undetected in PPC-1 due to its absence in its formulation. Furthermore, the concentration of titanium was progressively higher in PPC-3 and -4, compared to PPC-2, due to the use of progressively higher concentrations of nTiO2 as the nano-additive in PPC-3 (0.5%) and PPC-4 (2%).

On those coatings that contained titanium (PPC-2, -3 and -4), it appeared to be evenly dispersed across their surfaces. The EDX analyses measured a similar concentration of titanium at each of the three measurement sites for each coating. Furthermore, surface mapping of PPC-4 showed that the titanium was evenly distributed across the surface (FIG. 2(c)).

Complex Surface Topography

The PPC surfaces had complex micro-topographies (FIG. 2(a)). When the PPC surfaces were prepared, SEM examination showed complicated and elaborate surface topographies. There were numerous surface projections of nanometer scale and an underlying labyrinth of concavities that created intricate and elaborate surface topography. There were shallow and deep pits and cavities of micron dimension that contributed to surface roughness and porosity. The average porosity and the pore diameter of the PPC surfaces were 25% and ~20 mm, respectively.

Cells Attached to the PPC

Figure 3:
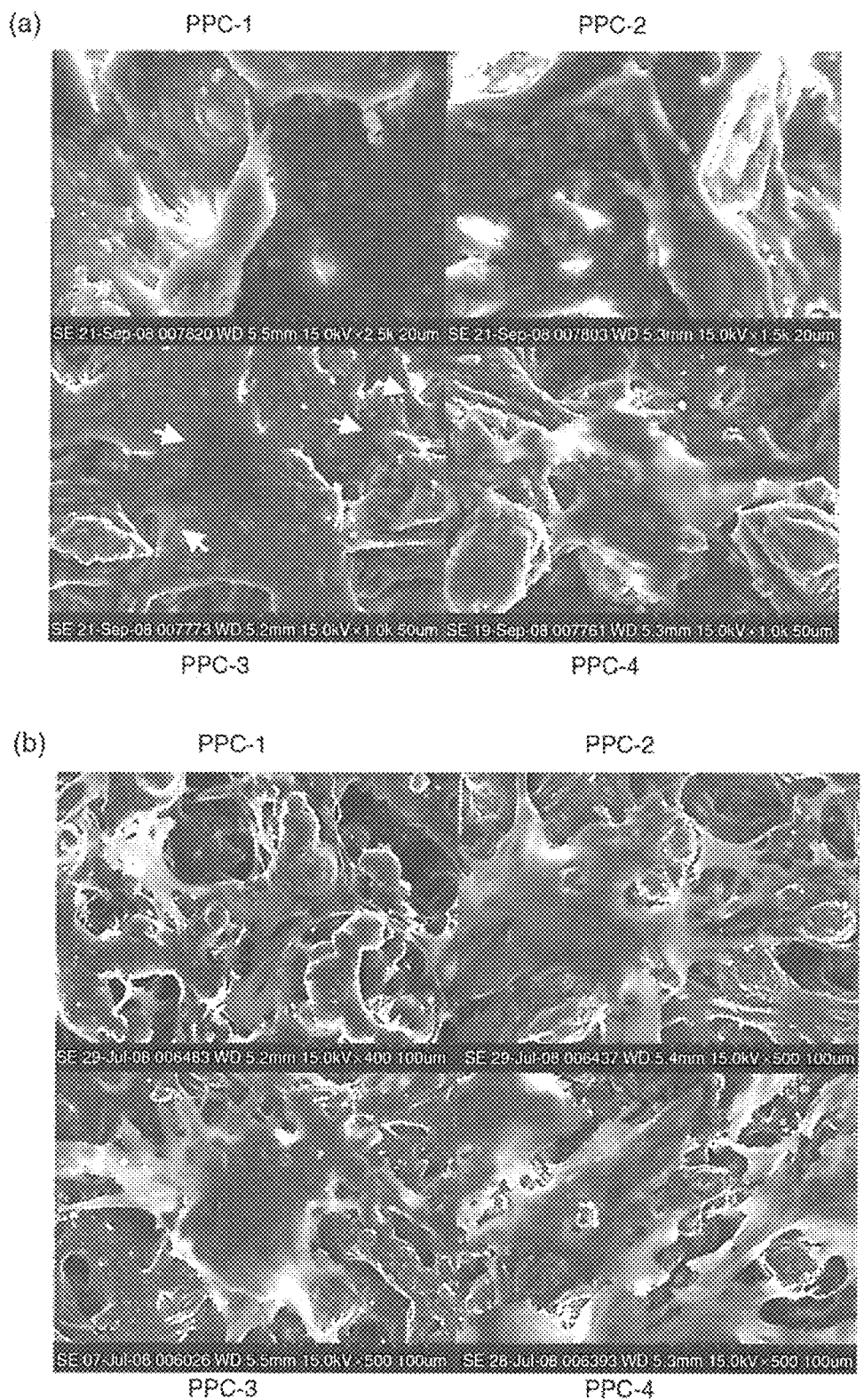
FIG. 3 shows (a) scanning electron microscopy images of human mesenchymal cells that were seeded onto polymeric powder coatings (PPC-1, -2, -3, and -4). After 24 h, scanning electron microscopy showed that there were few cells on PPC-1 and -2, but more cell attachment and spreading on PPC-3 and -4. (Scale bar=20 mm for PPC-1 and -2; scale bar=50 mm for PPC-3 and -4).
Figure 9:
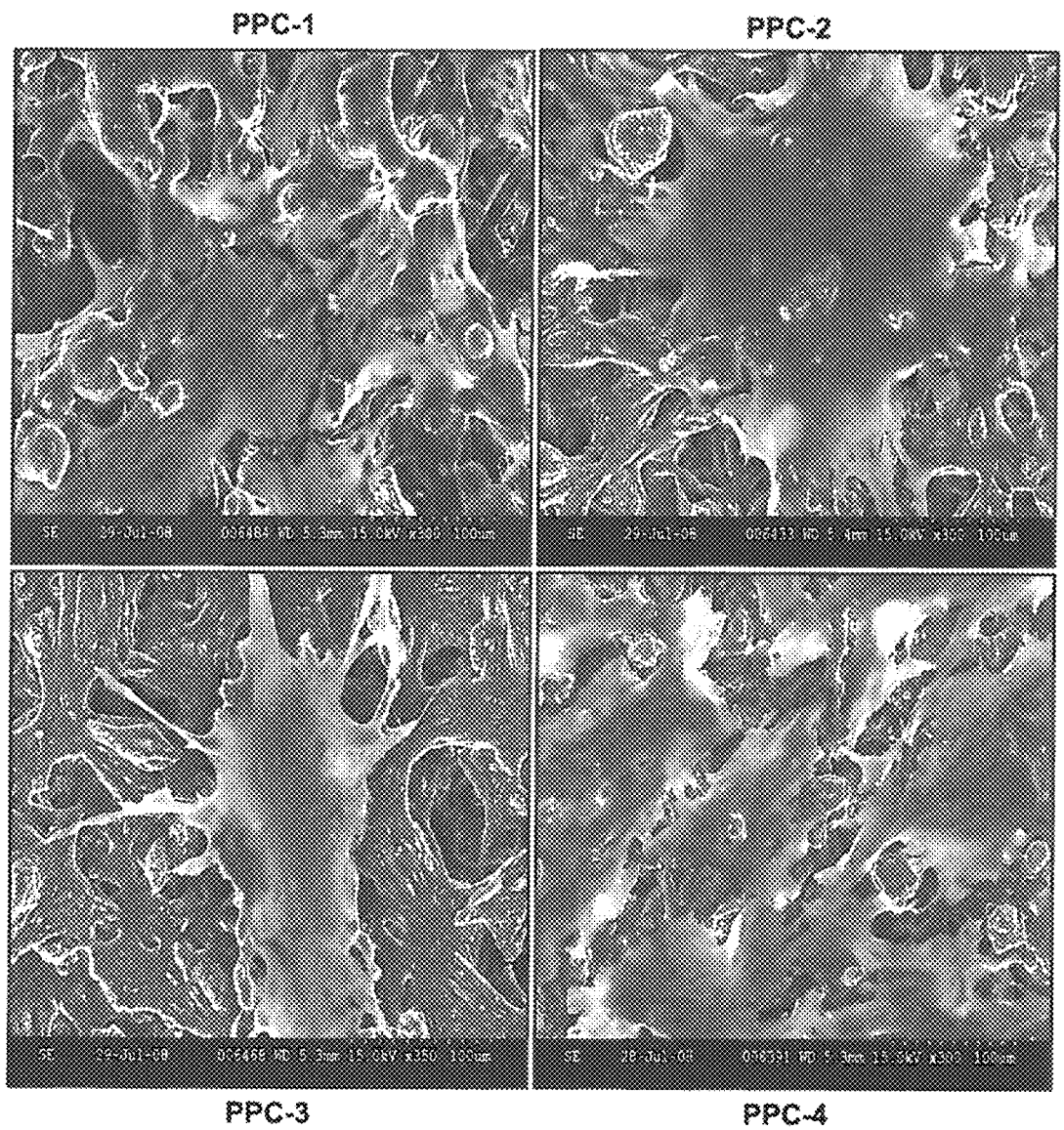
FIG. 9 shows scanning electron microscopy images of human mesenchymal cells (HEPM) that were seeded onto polymeric powder coatings (PPC-1, -2, -3 and -4). After 72 h, SEM showed several cells and cellular extensions on PPC-1, many attached and spread out cells on PPC-2 and -3, and nearly confluent cultures on PPC-4. (Scale bar=100 μm.)

The HEPM cells attached and spread out onto all of the PPC surfaces (FIGS. 3(a) and (b), 4 and 5). When the cells (50,000 cells/well) were incubated in 24-well tissue culture plates for 24 h, scanning electron microscope (SEM) showed that there were attached cells on all of the PPC surfaces (FIG. 3(a) and FIG. 9). There were numerous attached cells and they were well spread on PPC-4, and there were somewhat less attached cells and good spreading on PPC-3; but there were only few attached cells but little spreading on PPC-1 and -2. When these cells (50,000 cells/well) were incubated for 72 h, SEM showed that the cells had attached and spread out on all of the PPC surfaces (FIG. 3(b)). There were numerous cells that had attached and spread out on PPC-4 and -3, but only several cells on PPC-2 and PPC-1.

Extracellular Matrix Formed on Some PPC

Figure 4:
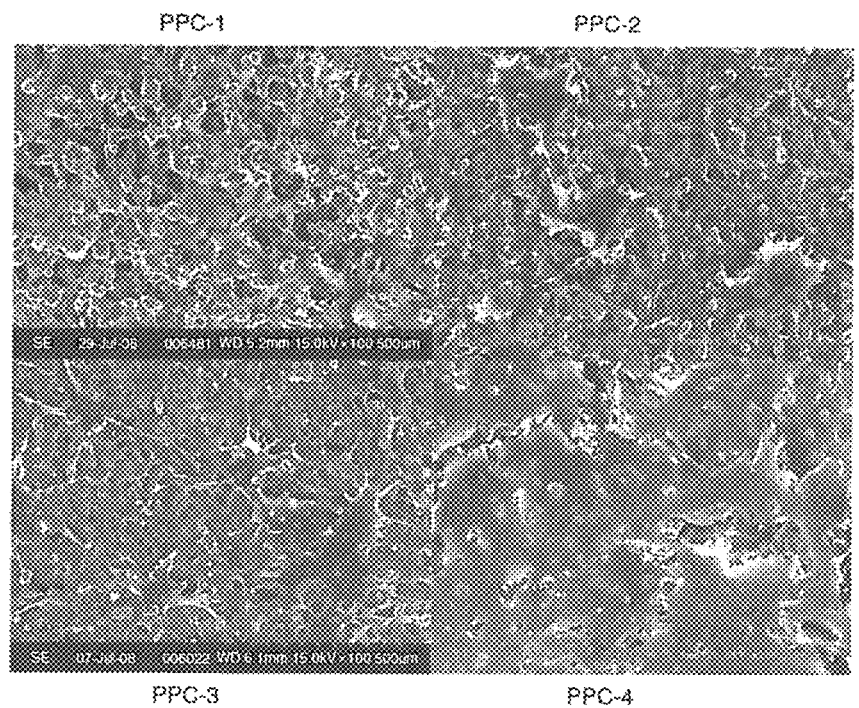
FIG. 4 shows scanning electron microscopy images of human mesenchymal cells that were seeded onto polymeric powder coatings (PPC-1, -2, -3, and -4). After 72 h, showed that cells had attached and spread out onto PPC-1, -2, and -3, and had formed an extensive matrix-like layer on PPC-4. (Scale bar=500 mm).

The HEPM cell cultures formed an extracellular matrix-like layer on some PPC surfaces (FIG. 4). When a larger number of cells (100,000 cells/well) were grown for 72 h, SEM showed that there were numerous attached cells on all of the PPC surfaces; and that a matrix-like layer had formed on some of the PPC surfaces. SEM showed that there was a matrix-like layer that covered most of PPC-4; smaller areas of matrix and cells that covered some of PPC-3; and clusters of cells on PPC-2 and -1.

Cell Spreading

Figure 5:
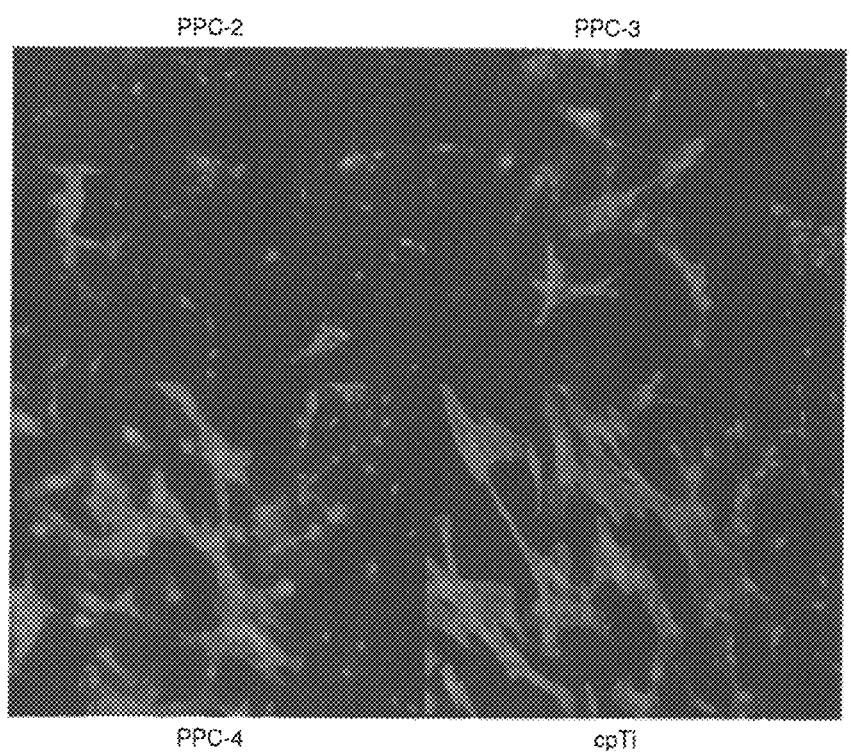
FIG. 5 provides inverted fluorescence microscopy images (20×) of human mesenchymal cells that were seeded onto polymeric powder coatings (PPC-1, -2, -3, and -4) and titanium (cpTi) surfaces. After 72 h, cell nuclei (the rounded opaque spots) and actin filaments (the elongated strands in the cells) were visible on PPC-2, -3, and -4, and on the titanium surfaces. There were numerous cells that had attached and were well spread out onto titanium and PPC-4. There were also several cells that had attached to PPC-2 and -3, but with less cell spreading. Hardly any cells that were visible on PPC-1 (not shown).

The HEPM cells spread out on some of the PPC surfaces (FIG. 5). When the cells (50,000 cells/well) were incubated in 24-well tissue culture plates for 72 h, inverted fluorescence microscopy showed that there were attached cells on PPC-2, -3 and -4, and on the commercially pure titanium (cpTi, control samples). Numerous cell nuclei were detected on PPC-3 and -4, and on cpTi; several nuclei were detected on PPC-2; and very few were visible on PPC-1 (not shown). The cells were well spread out on the PPC-4 and titanium surfaces, whereas they were less spread on PPC-2 and -3. Fewer actin filaments were visible on PPC-3 and -4, than on titanium that supported more clearly defined stress fibers.

Figure 10:
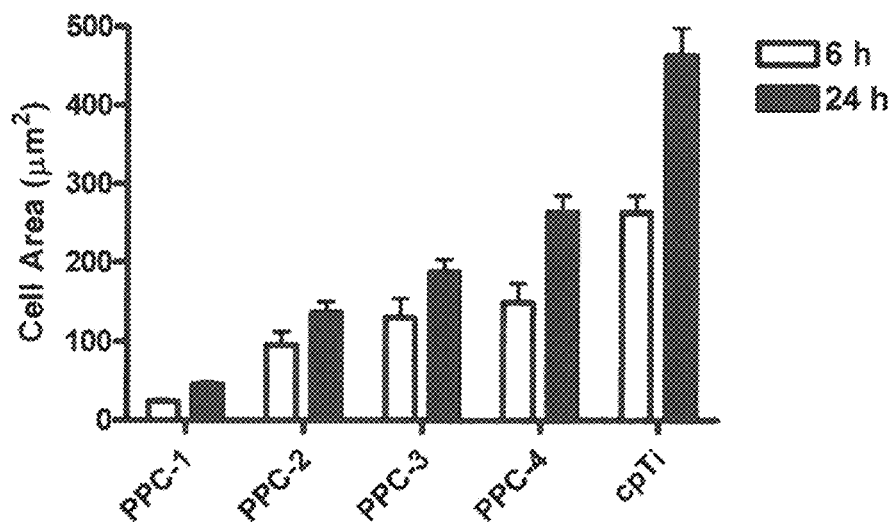
FIG. 10 shows cell area measurements of human mesenchymal cells (HEPM) seeded onto polymeric powder coatings (PPC-1, -2, -3 and -4) and titanium (cpTi) surfaces. After 6 and 24 h, cell spreading was visualized by inverted fluorescence microscopy (20×), and measured by Image J analysis. Cell spreading increased progressively from 6 to 24 h and from PPC-1 to -4.

Similarly, Image J analysis of fluorescently labeled cells showed that there was cell spreading on all of the PPC surfaces (FIG. 10). There was little spreading at 6 h, and more spreading after 24 h on all of the surfaces. The spreading increased progressively from PPC-1 through -2, -3 and -4, and the highest levels were measured on cpTi, after both 6 and 24 h of incubation. At 6 h, the spreading was significantly higher on cpTi than on PPC-1 ($P<0.001$), PPC-2 ($P<0.001$) and PPC-3 ($P<0.05$), whereas the spreading on cpTi and PPC-4 were not significantly different ($P>0.05$). However, after 24 h of incubation the spreading on cpTi became significantly higher than all of the PPC surfaces ($P<0.001$).

Cells Attachment and Proliferation on PPC

Figure 6:
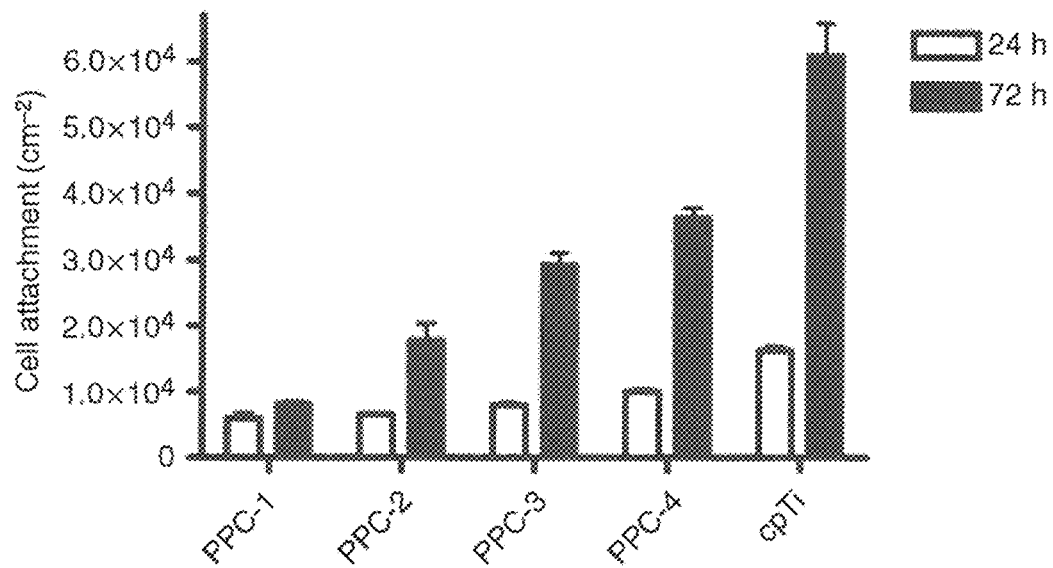
FIG. 6 shows results from human mesenchymal cells that were seeded onto polymeric powder coatings (PPC-1, -2, -3, and -4) and titanium (cpTi) surfaces. At 24 h there were attached cells on all of the surfaces. The highest counts were on titanium, which were significantly higher than on PPC-1, -2, and -3 (p50.05), but were not significantly higher than on PPC-4 (p40.05). After 72 h the counts on titanium were significantly higher than on all of the coatings (p50.001), and the counts on PPC-4 were significantly higher than on the other three coatings (p50.05).

The HEPM cells attached and proliferated on all of the PPC and titanium surfaces (FIG. 6). Within 24 h of seeding, the cell attachment assay counted a good number of cells that had attached to all of the surfaces. The counts increased progressively from PPC-1 through to PPC-4. The highest counts were on titanium, which were significantly higher than that on PPC-1 (p50.01), -2 (p50.01) and -3 (p50.05).

Additionally, the cell counts on titanium were higher than on PPC-4, although statistical analysis (ANOVA followed by Bonferroni) did not find a significant difference. Then, after 72 h of growth, the cell counts increased markedly on PPC-3 and -4, and on titanium; increased moderately on PPC-2; and increased slightly on PPC-1. After 72 h, the counts on titanium were significantly higher than that on PPC-1 (p50.001), -2 (p50.001), -3 (p50.01) and -4 (p50.05); and the counts on PPC-4 were also significantly higher than that on PPC-1 (p50.001), -2 (p50.001) and -3 (p50.05).

Cells Viability and Metabolic Activity on PPC

Figure 7:
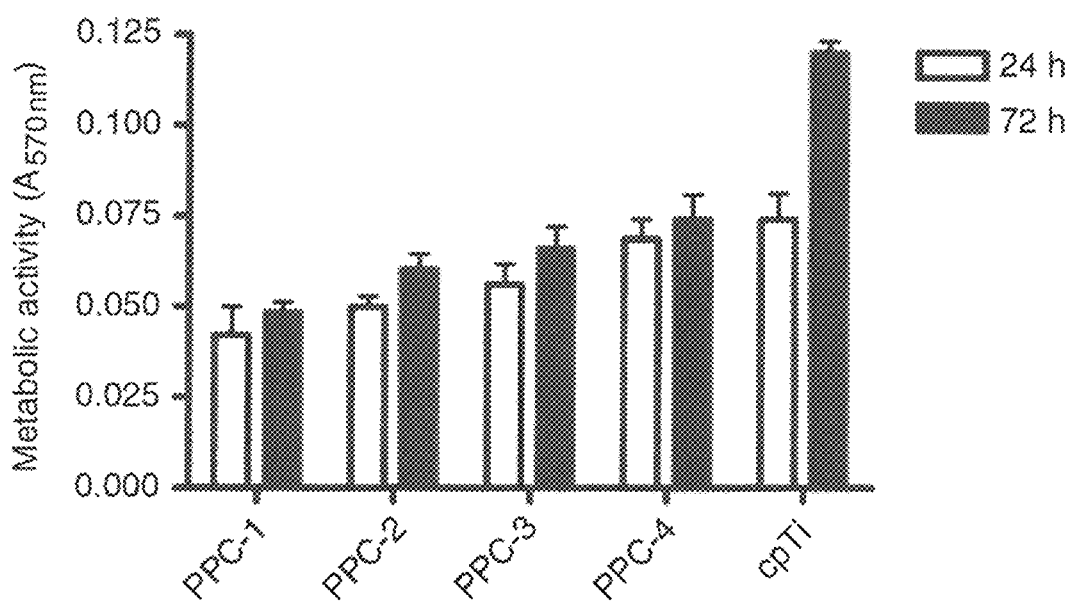
FIG. 7 plots the measured metabolic activity of human mesenchymal cells that were seeded onto polymeric powder coatings (PPC-1, -2, -3, and -4) and titanium (cpTi) surfaces. After 24 h of attachment, the MTT assay measured metabolically active cells that were collected from all of the surfaces. The highest measurements were from titanium, that were significantly higher than PPC-1 and -2 (p50.05), but not significantly higher than PPC-3 and -4 (p40.05). After 72 h the levels from cpTi were significantly higher than from all of the coatings (p50.001).

The HEPM cells maintained viability and metabolic activity on all of the PPC and titanium surfaces (FIG. 7). Within 24 h of attachment, the MTT assay measured high levels of mitochondrial enzyme activity in the cells that were collected from all of the surfaces. The levels increased progressively from PPC-1 through to PPC-4. The highest levels were measured in the cells from cpTi, which were significantly higher than on PPC-1 and -2 (p50.05), but not significantly higher than PPC-3 and -4 (p40.05). Then, after 72 h of growth, the levels increased markedly on titanium, and were significantly higher (p50.001) than all of the PPC surfaces.

The differences between PPC-1, -2, -3, and -4 were not significant (p40.05), with the exception that the levels on PPC-4 were significantly higher (p50.01) than on PPC-1 in both the 24 and 72 h cultures.

Osteogenic Differentiation Progression and Mineral Deposition

Figure 13:
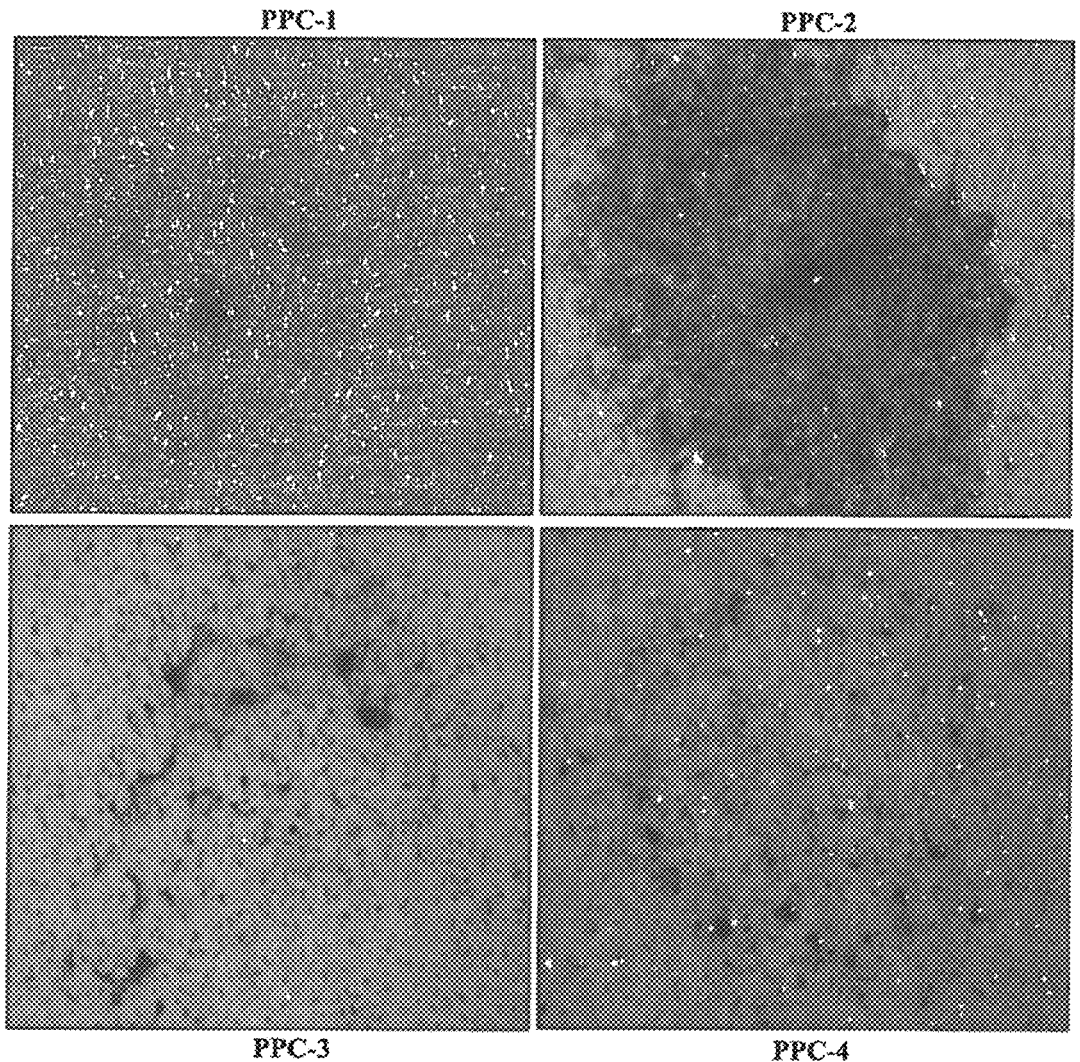
FIG. 13 show optical microscopy images obtained after 4 weeks of growth in osteogenic media, where Alizarin Red-S staining showed that mineralization was occurring. The mineral deposits were most abundant on PPC-2, moderately present on PPC-3 and -4, but nearly absent on PPC-1.

Alizarin Red-S staining showed that there was mineral deposition in the human mesenchymal cell cultures grown on PPC surfaces for 4 weeks (FIG. 13). There was widespread staining in the PPC-2 culture, and multiple stained areas on PPC-3 and -4, but limited staining on PPC-1. The mineral deposits were seen on PPC-2, -3 and -4, and they were more on PPC-2 than on -3 or -4, but they appeared to be almost absent from PPC-1.

Example 2

Cytocompatibility of Polymeric Powder Coatings Incorporating Biocompatible Material and Optional Submicron Polymer In this example, eight different coating compositions were produced according to aforementioned embodiments, in which biocompatible materials are added prior to forming a powder mixture that is subsequently powder coated onto a substrate. Table 5 below describes the different coating formulations and the measured surface roughness.

In the present experiment, thermosetting polymer resin powders were fully and uniformly mixed (epoxy, DER 663, Dow Chemical; or polyester, CrylCoat 2440-2, the U.S. UCB Surface Specialties Company) with biocompatible titanium dioxide powders (PPC-1 does not contain titanium dioxide). Additives were then incorporated into the mixture. The resulting mixture was processed by an extruder (SLJ30 twin-screw extruder, Yantai Donghui Powder Equipment Co., Ltd.) with a temperature set at 95° C. After extrusion, extruded paste was cooled to form sheets, which were subsequently crushed to form chips. The chips were further ground to obtain microscale particles with a diameter between 15 to 30 microns (typical of Group C powders) and screened afterward through a 45 micron mesh sifter to break apart any agglomerates.

The screened powders were then fully and uniformly mixed with submicron polytetrafluoroethylene (PTFE) particles (Zonyl® MP1000, DuPont) and nanoscale titanium dioxide particles (P25, U.S. Evonik company) by a high-shear mixer. The resulting dry powder was then spray coated onto a titanium substrate to form a biocompatible coating, which was cured at 200° C. for 10 minutes.

A series of tests were subsequently conducted to measure the physical properties and the biocompatibility of the cured coatings. All compositions in PPC-1 to PPC-7 could be evenly mixed together to form a uniform coating, and all of the coatings could be strongly and cohesively bonded to the implant substrate.

Comparing the compositions for PPC-1 to PPC-7, it was found that the submicron polytetrafluoroethylene (PTFE) particles (with a typical diameter of approximately 200 nanometers) were effective in controlling the microscale morphology of the coating, while titanium dioxide nanoparticles were effective in controlling the nanoscale surface morphology of the coatings.

Figure 14:
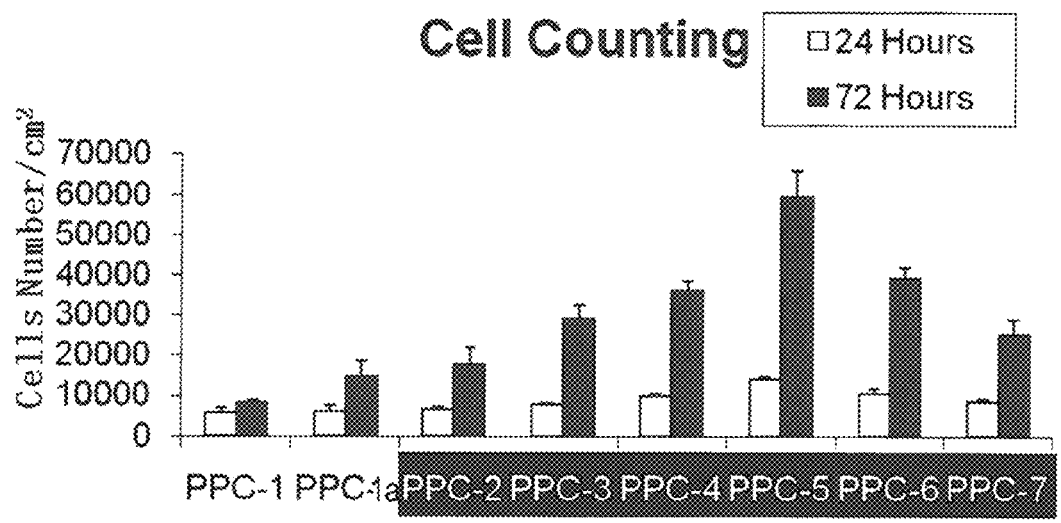
FIG. 14 plots cell counting results after 24 and 72 hours of cell culture for polymeric powder coatings incorporating a biocompatible material.

FIG. 14 shows cell counting results obtained after 24 and 72 hours of cell culture. After both 24 and 72 hours of culture on PPC-1 to PPC-7 coating surfaces, the largest number of human embryonic palatal mesenchymal cells were found to be grown on PPC-5 coatings surface. Similarly, compared to the results from after 24 hour to after 72 hours culture, the most significant increase of the number of cells was also observed on PPC-5.

The results showed that all the coatings, from PPC-1 to PPC-7, are biocompatible and human cells grow on all of these surfaces. PPC-1 exhibited the lowest biocompatibility due to the absence of the biocompatible component (in this example, titanium dioxide) in the composition. The biocompatibility of PPC-1a was shown to be higher than PPC-1, but lower than PPC-2, which demonstrated that the coating biocompatibility increases as titanium dioxide increases.

The biocompatibility of PPC-3 was observed to be higher than that of PPC-2. This suggests that compared to the nanos-

TABLE 5

Compositions of Polymeric Powder Coatings PPC1-7

| Sample | Polymers and Other Additives* | Nano-Particles* | Surface Roughness |
| --- | --- | --- | --- |
| PPC-1 | 55% epoxy resin, 3% PTFE ** | 0.5% silica | 251.3 ± 22.3 |
| PPC-1a | 55% polyester resin, 3% PTFE, 10% titanium dioxide ** | 0.5% silica | 269.5 ± 34.7 |
| PPC-2 | 55% polyester resin, 3% PTFE, 25% titanium dioxide ** | 0.5% silica | 268.3 ± 26.9 |
| PPC-3 | 55% polyester resin, 3% PTFE, 25% titanium dioxide ** | 0.5% titanium dioxide | 262.8 ± 18.1 |
| PPC-4 | 55% polyester resin, 3% PTFE, 25% titanium dioxide ** | 2.0% titanium dioxide | 281.9 ± 13.8 |
| PPC-5 | 55% polyester resin, 25% titanium dioxide ** | 0.5% titanium dioxide | 37.0 ± 2.8 |
| PPC-6 | 55% polyester resin, 1% PTFE, 25% titanium dioxide ** | 0.5% titanium dioxide | 50.9 ± 3.9 |
| PPC-7 | 55% polyester resin, 2% PTFE, 25% titanium dioxide ** | 0.5% titanium dioxide | 135.1 ± 18 |

*All of the formulations are given as a percentage of the total weight content (% wt).
** The balance includes barium sulfate as filler, and minor amount of degassing agent, flow agent and curing agent.

cale silica, nanoscale titanium dioxide not only enhances the surface nanoscale morphology, but also the coating biocompatibility.

Although sub-microscale polytetrafluoroethylene PTFE was shown to enhance the surface microscale morphology, such morphology was not observed to effectively enhance the biocompatibility of the coatings. In contrast, nanoscale titanium dioxide was shown to enhance the surface's nanoscale morphology so as to effectively enhance the biocompatibility of the coatings.

PPC-5 showed the best biocompatibility, and was observed to effectively support human embryonic palatal mesenchymal cell adhesion, growth, proliferation and differentiation.

Example 3

Demonstration of Bioactive Effect of Mineral Trioxide Aggregates Incorporated into Biocompatible Polymeric Powder Coating The purpose of this investigation was to study the effects of a bioactive material (MTA) on the properties of the biocompatible coatings. In the study, 6 different coating compositions were produced (as shown below) and compared with PPC-5 of Example 2. The compositions of the 6 coating materials are shown in Table 6.

TABLE 6

Compositions of Polymeric Powder Coatings

| Sample | Polymers and Other Additives | Nanoparticles |
|---|---|---|
| PPC-5 | 55% polyester resin, 25% titanium dioxide, balance is fillers and assists | 0.5% titanium dioxide |
| WMPPC-5a | 55% polyester resin, 25% titanium dioxide, 1% white MTA, balance is fillers and assists | 0.5% titanium dioxide |
| WMPPC-5b | 55% polyester resin, 25% titanium dioxide, 5% white MTA, balance is fillers and assists | 0.5% titanium dioxide |
| WMPPC-5c | 55% polyester resin, 25% titanium dioxide, 10% white MTA, balance is fillers and assists | 0.5% titanium dioxide |
| GMPPC-5a | 55% polyester resin, 25% titanium dioxide, 1% grey MTA, balance is fillers and assists | 0.5% titanium dioxide |
| GMPPC-5b | 55% polyester resin, 25% titanium dioxide, 5% grey MTA, balance is fillers and assists | 0.5% titanium dioxide |
| GMPPC-5c | 55% polyester resin, 25% titanium dioxide, 10% grey MTA, balance is fillers and assists | 0.5% titanium dioxide |

** The balance includes barium sulfate as filler, and minor amount of degassing agent, flow agent and curing agent.

In the experiment, the polymer powders were uniformly mixed (polyester, CrylCoat 2440-2, the U.S. UCB Surface Specialties Company) with titanium dioxide powders, and processed as described in Example 2 to produce a microscale powder.

For this particular example, the bioactive material MTA (grey and white MTA, ProRoot MTA, Dentsply, USA) was dry-blended at various concentrations (1% wt., 5% wt. and 10% wt.) into the coating powder. The mixture powders were fully and uniformly mixed with 0.5% nanoscale titanium dioxide particles (P25, U.S. Evonik company) by the high-shear mixer; the coating compositions were thus obtained and then applied to a pure titanium panel and cured at 200° C. for 10 minutes.

A series of tests were conducted for the physical properties and the biocompatibility of the cured coatings. The physical properties of the coatings were shown as follows. PPC-5, GMPPC-5 and WMPPC-5 were observed to exhibit similar surface nanoscale morphology. All compositions in PPC-5, GMPPC-5a-c and WMPPC-5a-c could be evenly mixed together to form a uniform coating and could also be strongly and cohesively bonded to the implant substrate.

Figure 15:
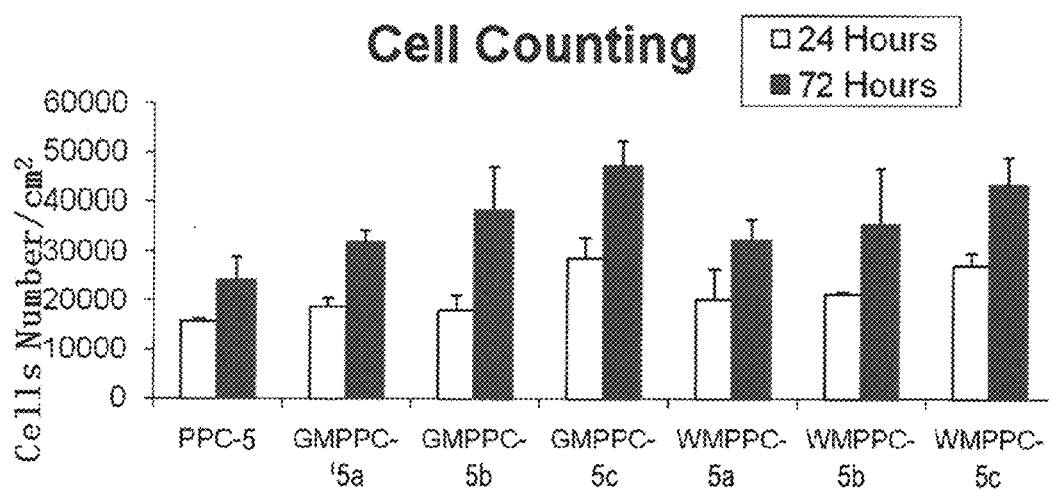
FIG. 15 plots cell counting results after 24 hours and 72 hours of cell culture for polymeric powder coatings incorporating mineral trioxide aggregates.

FIG. 15 shows the cell counting results after 24 hours and 72 hours of cell culture. After 24 and 72 hours of cell culture in the incubator, the number of human embryonic palatal mesenchymal cells grown on GMPPC-5a, GMPPC-5b, GMPPC-5c, WMPPC-5a, WMPPC-5b and WMPPC-5c coating surfaces were observed to be higher than the number of cells grown on PPC-5. Moreover, compared to the results obtained after 24 hours, the most significant increase of the number of cells was observed on GMPPC-5. The results demonstrated that compared to PPC-5, GMPPC-5 and WMPPC-5 were more effective in supporting growth and proliferation of human embryonic palatal mesenchymal cells.

Accordingly, it was found that when compared to highly biocompatible PPC-5, the addition of bioactive grey and white MTA could further enhance the biocompatibility of coatings and support attachment, growth, proliferation and differentiation of human embryonic palatal mesenchymal cells. Furthermore, with the increase of the concentration of grey and white MTA in the coating composition, the biocompatibility of GMPPC and WMPPC was observed to be improved. This result could be attributed to the bioactivity of MTA materials.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

Therefore what is claimed is:

1. A powder mixture comprising:
   a first powder comprising microscale polymeric particles; and
   a second powder comprising nanoparticles;
   wherein said microscale polymeric particles comprise a thermosetting polymer resin and a biocompatible material; and
   wherein said microscale polymeric particles further comprise a bioactive material.

2. The powder mixture according to claim 1 wherein said thermosetting polymer resin is selected from the group consisting of an epoxy resin, polyacrylic acid resin, polyurethane resin, polyester resin, and mixtures thereof.

3. The powder mixture according to claim 1 wherein said biocompatible material is a biocompatible metal oxide.

4. The powder mixture according to claim 1 wherein said bioactive material comprises mineral trioxide aggregates.

5. The powder mixture according to claim 1 wherein said biocompatible material is a bio-inert ceramic.

6. The powder mixture according to claim 1 wherein said biocompatible material comprises titanium.

7. The powder mixture according to claim 1 wherein said nanoparticles are metal-oxide nanoparticles.

8. The powder mixture according to claim 7 wherein said metal-oxide is selected from the group consisting of titania, silica, and alumina.

9. The powder mixture according to claim 1 further comprising submicron polymer particles.

10. The powder mixture according to claim 9 wherein said submicron polymer particles are provided in an amount ranging from about 0.1% to 3% by weight of said powder mixture.

11. A polymeric biocompatible coating layer comprising:
    a thermosetting polymer;
    a biocompatible material, nanoparticles; and a bioactive material;

wherein said coating layer has a surface roughness on a nanometer scale; and wherein said bioactive material comprises mineral trioxide aggregates.

12. A polymeric biocompatible coating layer comprising:

a thermosetting polymer;

a biocompatible material, and nanoparticles;

wherein said coating layer has a surface roughness on a nanometer scale; and wherein said biocompatible coating layer further comprises submicron polymer particles.

13. The polymeric biocompatible coating according to claim 12, wherein said submicron polymer particles are provided in an amount ranging from about 0.1% to 3% by weight of said coating layer.

14. A powder mixture comprising:

a first powder comprising microscale polymeric particles;

a second powder comprising nanoparticles; and submicron polymer particles;

wherein said microscale polymeric particles comprise a thermosetting polymer resin and a biocompatible material.

15. The powder mixture according to claim 14 wherein said submicron polymer particles are provided in an amount ranging from about 0.1% to 3% by weight of said powder mixture.

16. A powder mixture comprising:

a first powder comprising microscale polymeric particles; and a second powder comprising nanoparticles;

wherein said microscale polymeric particles comprise a thermosetting polymer resin and a biocompatible material;

wherein the biocompatible material is selected from the group consisting of oxide ceramics, $Si_3N_4$ ceramics, glass ceramics, carbon materials, biomedical metallic materials, titanium, titanium alloy, cobalt oxide, calcium oxide and zirconia; and wherein the nanoparticles are selected from the group consisting of titania, silica and alumina.

* * * * *